United States Patent [19]

Wagner et al.

[11] 4,370,648

[45] Jan. 25, 1983

[54] SYNCHRONIZING CIRCUIT FOR USE WITH A TELECOMMUNICATION SYSTEM

[75] Inventors: Theodore Wagner, West Palm Beach; Ramesh M. Vyas, Boca Raton; Samuel Liang, Deerfield Beach, all of Fla.

[73] Assignee: Siemens Corporation, Iselin, N.J.

[21] Appl. No.: 249,399

[22] Filed: Mar. 31, 1981

[51] Int. Cl.³ .................... H04J 3/06; H04Q 11/04
[52] U.S. Cl. ................................ 340/825.2; 370/105
[58] Field of Search .......... 340/825.2, 825.21, 825.14; 370/82, 105, 108

[56] References Cited

U.S. PATENT DOCUMENTS

| | | | |
|---|---|---|---|
| 2,927,965 | 3/1960 | Waer | 370/105 |
| 3,576,947 | 5/1971 | Kruger | 370/105 |
| 3,987,251 | 10/1976 | Texier et al. | 370/105 |
| 4,002,846 | 1/1977 | Barbier | 370/105 |
| 4,132,867 | 1/1979 | Siglow | 370/105 |

FOREIGN PATENT DOCUMENTS 2619333 11/1977 Fed. Rep. of Germany .
2621603 11/1977 Fed. Rep. of Germany .

Primary Examiner—Donald J. Yusko

[57] ABSTRACT

A synchronizing circuit for use with a digital communication system is disclosed. A serial data stream is arranged in frames composed of at least two data words containing a synchronization signalling code and binary coded information, respectively. For detecting the alignment of consecutive frames the synchronizing circuit includes a serial/parallel converter and a synchronizing detector logic network for generating two control signals indicating the presence of the synchronization code in form of a normal synchronizing bit pattern or an inverted synchronizing bit pattern respectively. An AND-gate logically links the first control signal delayed by one pulse frame to the undelayed second control signal and generates a synchronizing signal. A time slot generator produces enabling signals by means of counting subsequent system clock pulses under control of this synchronizing signal such that during receiving of different data words of a frame a respective one of the enabling signals is present.

9 Claims, 18 Drawing Figures

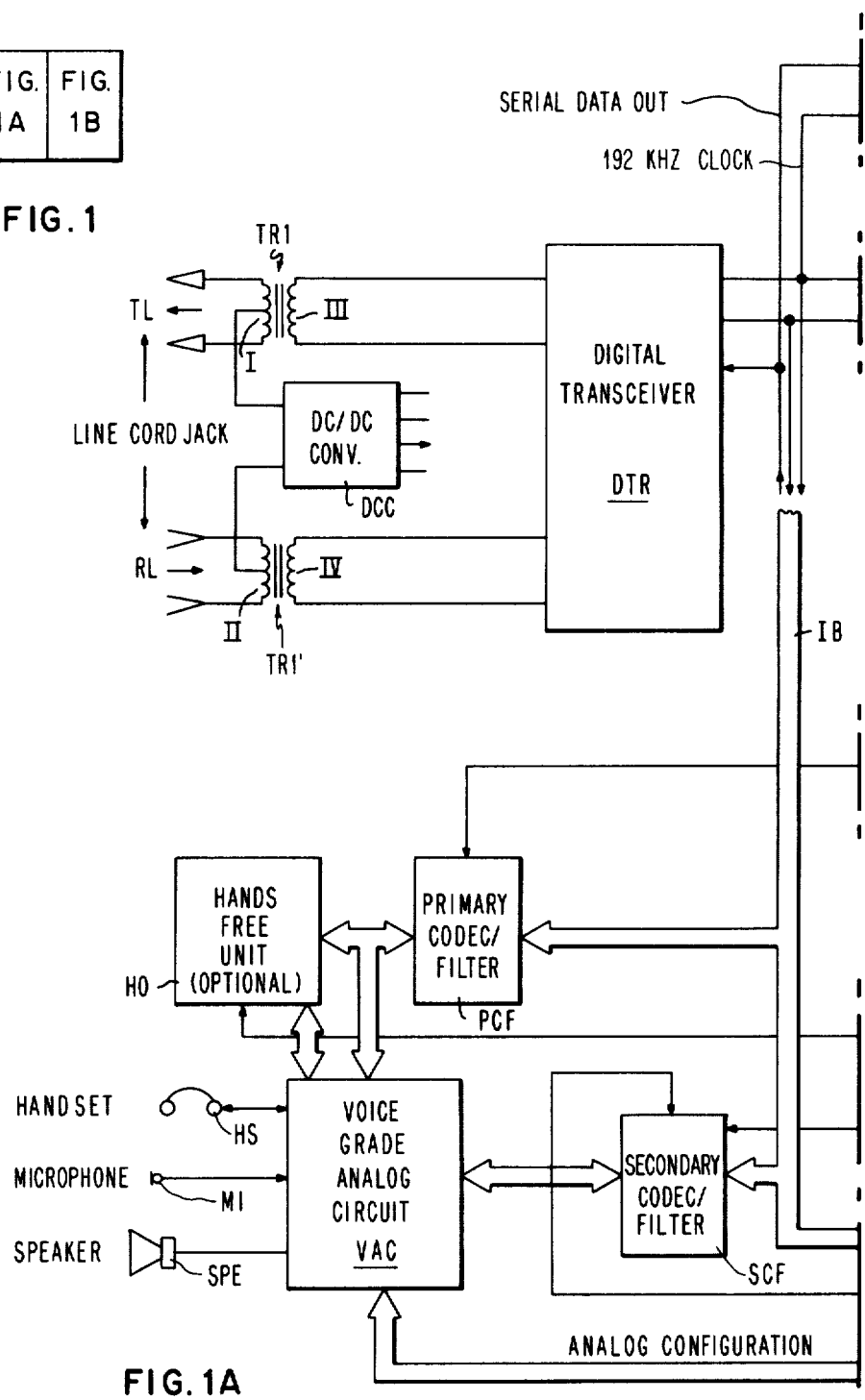

| FIG. 12A | FIG. 12B |
|----------|----------|

SYNCHRONIZING CIRCUIT FOR USE WITH A TELECOMMUNICATION SYSTEM

CROSS-REFERENCE TO RELATED APPLICATIONS

This application is related to the following commonly-owned U.S. patent applications:
(1) U.S. patent application Ser. No. 249,377 of Donald Gray and Theodore Wagner for "A Transceiver Unit for Use with a Telecommunication System";
(2) U.S. patent application Ser. No. 249,400 of Theodore Wagner, Sam Liang and Deepak R. Muzumdar for "Digital Telephone Apparatus";
(3) U.S. patent application Ser. No. 249,395 of Deepak R. Muzumdar, George Mierzwa, Richard Sanders and Orrie J. Vander Meiden for "Frame Format for PCM Speech Data in a Telephone Transmission System & Digital Telephone Apparatus for Use with this Frame Format"; and
(4) U.S. patent application Ser. No. 249,390 of Mustafa Y. M. Saleh for "DC/DC Converter".

BACKGROUND OF THE INVENTION

The invention is related to a digital telecommunication system for transmitting information between any one of a multiplicity of peripheral devices such as subscriber stations and data terminals under control of a central switch. In such systems, information transfer is performed by sampling the current condition of a peripheral device at a fixed sampling rate and by encoding the sample into digitalized information comprising a data word. Pulse code modulation (PCM) may be used for transmitting information in form of a serial data stream which is composed of frames each containing at least such a data word. Transmission lines are arranged between the peripheral devices and the central switch to accomplish the information transfer.

More specifically, the peripheral device connected to a transmission line enabling duplex communication with other peripheral devices may be subscriber stations, attendant consoles of a telephone switch or other recording and data transmitting units which comprise digital data terminals also using telephone lines for data transmission.

Conventional digital telecommunication systems are based upon two different transmission schemes for enabling duplex communication with sufficient transmission quality. In one scheme there is provided a plurality of transmission lines representing separate channels for useful information, such as speech or digital data, in each direction, for signalling and for synchronizing, wherein additionally for transmitting a direct current power supply at least one pair of wires of a transmission line is necessary. The second conventional transmission scheme is based upon a so-called "ping-pong" duplex data transmission procedure, that is data to be transmitted in opposite directions are alternatively generated in subsequent time periods of equal length and the two- or four-wire transmission line is alternatively used for transmitting information in the one or the other direction.

Since, in addition to binary coded information quite an amount of control information such as signalling information and synchronizing information has to be transmitted for control purposes between the central switch of the telecommunication system and the peripheral devices, it is desirable to organize the signal transfer such that control information and useful information can be transmitted simultaneously without any additional pairs of wires in a transmission line.

It is, therefore, an object of this invention to provide synchronizing means suitable for a digital telecommunication system transmitting useful information, such as digitalized voice samples, and control information simultaneously in one frame format. This means that a frame of the serial data stream is composed of a data word representing synchronization and signalling information and of at least one further data word containing the useful information.

Another object of the present invention is to provide a synchronizing circuit for detecting the alignment of pulse frames within a serial data stream under control of a system clock pulse train and for specifying time slots by means of respective enabling signals each determining, while activated, the occurrence of a specific time period wherein the respective data word of a frame is present.

Still another object of the present invention is to provide such a synchronizing circuit having a high quality performance which is achieved by a minimum outlay of electronic circuitry composed of commercially available circuits and components.

SUMMARY OF THE INVENTION

These objects, as well as other objects, which will become apparent from the discussion which follows, are achieved according to the present invention by a synchronizing circuit of a digital communication system. The system includes a transmission line arranged between a transmitting and a receiving terminal for transmitting a serial data stream at a fixed data rate under control of a clock pulse train received by a system clock pulse line. The serial data stream is arranged in frames. Each frame is composed of a first data word containing a binary synchronization code for recovering the frame in the continuous serial data stream and a signalling code for enabling control operations of the communication system and at least a second data word containing encoded binary information. The synchronizing circuit adapted to be connected to the receiving end of the transmission line for recovering the alignment of consecutive frames in the serial data stream is provided with a serial/parallel converter designed for a capacity of one data word. The converter has a serial data input coupled to the transmission line, a clock input connected to the system clock pulse line, and a plurality of parallel data outputs. A synchronizing detector logic network generates a first and a second control signal and has parallel inputs each connected to a respective one of the parallel data outputs of the serial/parallel converter. The first and the second control signal are produced at a respective one of a first and a second output. Each control signal occurs whenever a condition at the parallel data output of the serial/parallel converter reflects a normal synchronizing bit pattern and an inverted synchronizing bit pattern, respectively.

There are provided means for delaying the first control signal for a time span needed for receiving one frame. These delay means have an input and an output. The input of the delay means is connected to the first output of the synchronizing detector logic network.

By an AND-gate having a first and a second input and an output in synchronized operation a synchronizing signal is generated once every alternate frame. The first input of the AND-gate is connected to the output of the delay means. The second input of the AND-gate is connected to the second output of the synchronizing detector logic network.

Furthermore, there is provided a time slot generator. It has a clock input for receiving the system clock pulse train, a synchronizing signal input connected to the output of the AND-gate, a first and a second generator output. Each of these generator outputs carries a respective one of a first and a second enabling signal. The time slot generator includes means for counting subsequent clock pulses under control of the synchronizing signal such that during receiving the first data word the first generator output and during receiving the second data word the second generator output subsequently are carrying a respective one of the enabling signals.

A high reliability of the synchronizing circuit is based upon the alternating use of synchronizing bit patterns of normal logic level and inverted logic level contained in two consecutive frames of the serial data stream. The first data word of a frame preferably is composed of seven synchronizing bits representing one of these synchronizing bit patterns and a signalling bit determining control functions within a transmission procedure. The synchronizing bit pattern is highly uncorrelated with all the possible patterns of data words of binary coded information and the fail-safe operation is even more increased by alternating this uncorrelated bit pattern with the inverse of this pattern in consecutive frames.

Synchronizing operations are achieved by a minimum of hardware composed of commercially available circuits. The synchronizing detector logic network may be a logic network of inverters and AND-gates, implemented as all zero detectors. The synchronizing circuit furthermore employs binary counter arrangements designed for dividing a system clock pulse train by integrals in accordance with either the number of bits in a pulse frame or a data word. Thereby it is achieved that once the synchronized mode of operation is detected the synchronizing circuit is locked onto this mode of operation under control of the system clock pulse train whereby a very high noise immunity is achieved. The synchronizing circuit could lose the synchronized mode of operation only if a slippage of the synchronizing code occurred. In this case, the synchronizing circuit will be reset to an initial condition and will regain the synchronized mode of operation when the synchronizing bit patterns of the next two pulse frames have been detected.

BRIEF DESCRIPTION OF THE DRAWINGS

FIG. 1 is a block diagram and FIGS. 1A and 1B are a schematic diagram of a digital telephone apparatus according to the invention and suitable for subscriber stations and attendant consoles.

DETAILED DESCRIPTION OF A PREFERRED EMBODIMENT

The invention will now be described with reference to a preferred embodiment of a telephone apparatus suitable for subscriber stations and attendant consoles equipped either with or without use or more optional features such as a speakerphone ("hands free") unit, a digital data interface, a subscriber message detailed recording printer and the like. This digital telephone apparatus is connected for duplex communications with a telephone transmission line that forms a part of a digital telephone system. Such a system may comprise a private branch exchange (PABX) or may constitute a public telephone system.

Figure 1B:
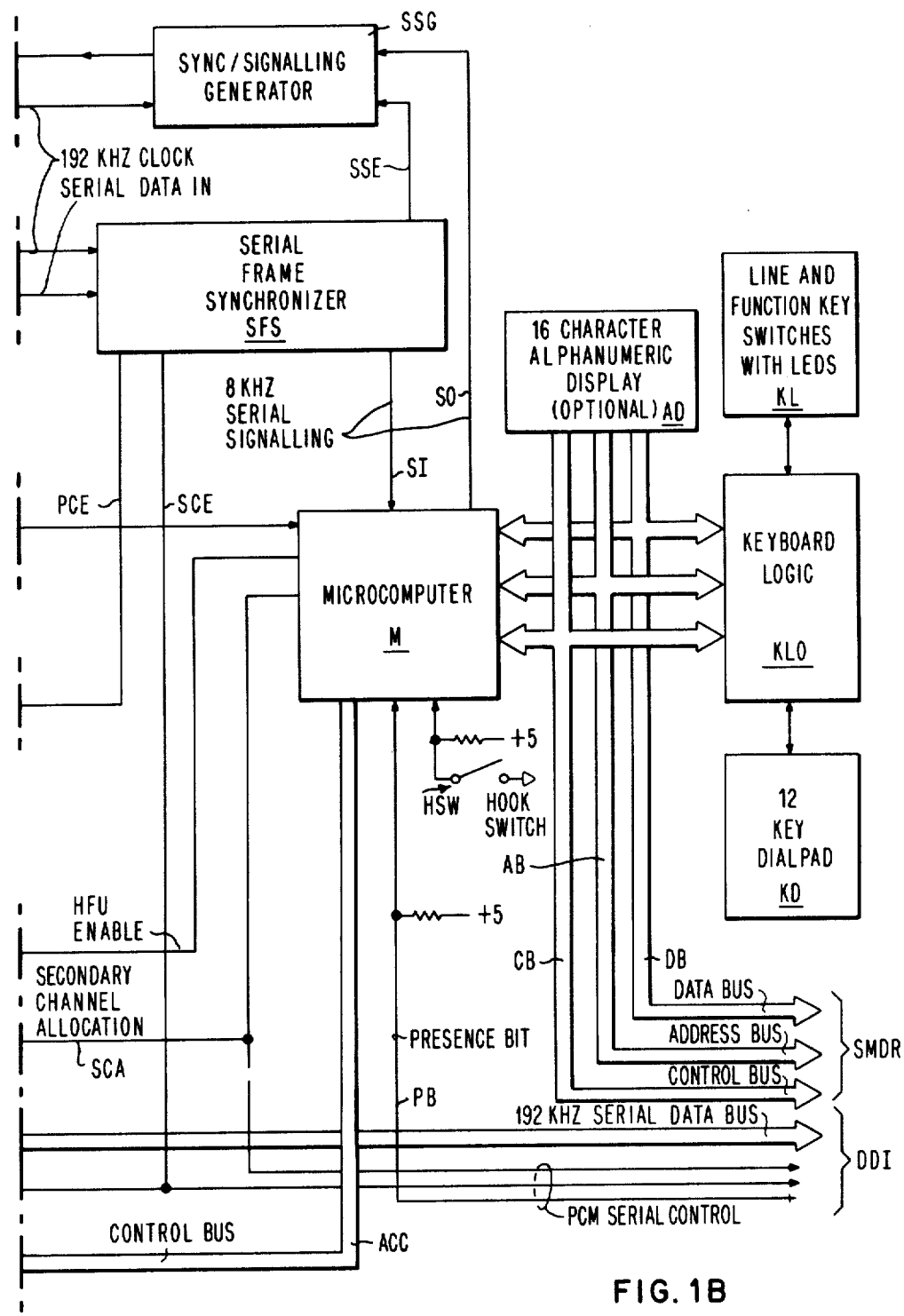

Apparatus Architecture (FIG. 1)

FIG. 1 shows a digital telephone apparatus suitable for subscriber stations and attendant consoles. This apparatus may be connected to peripheral, optional equipment (not shown) such as a digital data interface DDI or a subscriber message detailed recording printer SMDR. The digital telephone apparatus is connected for duplex communications with a telephone transmission line TL/RL. The transmission line TL/RL is connected with windings I and II of transformers TR1 and TR1'. These transformers provides a phantom pair of wires, which is connected with a DC/DC power supply converter DCC. This converter receives direct current from the transmission line and generates the different DC voltages needed for the apparatus.

Secondary windings III and IV of transformers TR1 and TR1' are connected with a digital transmitter/-receiver or "transceiver" DTR. The two wire pair TL of the transmission line are the transmitting wires; the two wire pair RL of the transmission line are the receiving wires. The transceiver DTR simultaneously transmits on the line TL and receives from the line RL a plurality of different data words which are arranged in a prescribed three-word frame format, described herein below, and encoded with alternate mark inversion.

The transceiver DTR converts the alternate mark inversion encoded signal received from the transmission line RL into a 192 KHz clock as well as a serial data stream, herein called "serial data in". The transceiver also converts a data stream called "serial data out" from the telephone apparatus into an alternate mark inverted encoded signal for transmission on the line TL.

The 192 KHz clock signal is passed via an internal, serial data bus IB to a sync/signal generator SSG, a serial frame synchronizer SFS, a primary codec/PCM filter PCF, a secondary codec/PCM filter SCF and at least one peripheral system, for example, the digital data interface DDI of a digital computer or the like. Serial data received from the transmssion line RL is passed via the internal data bus IB to the serial frame synchronizer SFS, the primary codec/PCM filter PCF, the secondary codec/PCM filter SCF and the peripheral system DDI. The digital transceiver DTR receives a serial data stream, for transmission onto the transmission line TL, via the internal data bus IB from the sync/signal generator SSG, the primary codec/PCM filter PCF, the secondary codec/PCM filter SCF and the peripheral system DDI.

The serial frame synchronizer SFS detects from the received serial data the synchronizing code and the signalling bit or bits, which are transmitted in one word of the frame format, so as to synchronize the different time slots of a frame format in time. The serial frame synchronizer generates three enabling signals in synchronism with the three eight-bit words or bytes of each frame format: sync/signalling enable SSE, primary channel enable PCE, and secondary channel enable SCE. The signal SSE is passed to the sync/signalling generator SSG which generates a word (byte) comprising a seven bit synchronization code and a single signalling bit received from the microcomputer M via the signalling output line 50. Upon receipt of the signal SSE, and sync/signalling generator passes this word out on the serial data out line of the internal bus to the digital transceiver DTR.

The signal PCE is passed to the microcomputer M and to the primary codec/PCM filter PCF. The rising edge of the signal PCE informs the microcomputer to look for a signalling bit on the signalling input line SI. The signal PCE also enables the primary codec/PCM filter PCF to receive and transmit on the serial data in a serial data out lines, respectively.

The signal SCE enables the secondary codec/PCM filter SCF and/or the digital data interface DDI for transmission of serial data to and from these units. Selection of one of these units is made by the microcomputer M via a secondary channel allocation signal SCA. The digital data interface requests access to the secondary channel via a presence bit PB.

Both the microphone and the receiver of the handset as well as the microphone and the loudspeaker of the speakerphone or "hands free unit" are connectable by means of microcomputer-controlled switches with either one (but only one) of the two codec/PCM filters PCF and SCF. These switches belong to the voice grade analog circuit VAC which is controlled by the microcomputer M via an analog configuration control bus ACC. Normally there is no hands free feature in the telephone apparatus because the optional hands free circuit board HO is needed. If added, this hands free circuit board HO is enabled by a signal "HFU enable" from the microcomputer and will only be used in connection with one of the two codec/PCM filters. The hands free circuit selects for transmission the voice of the loudest speaker. It may be a conventional unit and will not be described herein because it forms no part of the present invention.

If one of the codec/PCM filters is connected with the telephone handset for transmitting and receiving of one word of the frame format, thus transmitting and receiving on one channel, a peripheral system, for example the digital data interface DDI, may be enabled to transmit on the other channel. As will be pointed out below, the three-word, two-channel frame format permits the multiplexing of both voice and data, or voice and voice.

In addition to these connections the telephone apparatus may hold a connection with an external subscriber via one codec/PCM filter and, in response to a signal from the subscriber, can make a call back connection via the second codec/PCM filter; that is, via a separate data word or channel of the frame format. In this case the first connection will be disconnected by the voice grade analog circuit VAC and the second connection will be established via the second codec/PCM filter and the voice grade analog circuit.

Thus the two channel frame format permits the telephone apparatus to support two different telecommunication connections simultaneously. For example, one connection may be made with another telephone subscriber for a voice communications while another connection is made with a data system for the transmission of digital data. Alternatively, the telephone apparatus may support a first subscriber to subscriber connection for normal voice communication plus a second subscriber to subscriber connection in a call back function.

As noted above, the microcomputer M controls the switching of the voice grade analog circuit VAC and the hands free circuit HO via the analog configuration control bus ACC and the control line "HFU enable", respectively. Furthermore, the microcomputer M controls the use of the second channel in the PCM frame via the secondary channel allocation line SCA. In this way, a peripheral data system connected to the digital data interface DDI may transmit and receive data via the telephone transmission line TL/RL.

However, the microcomputer has other functions as well. All the data which are transmitted and received over the internal data bus IB are fast data signals: In this embodiment, one word or byte per channel is transmitted every 125 microseconds. As will be explained below, the frame format also supports the transmission of slower data which are needed to perform such functions as setting characters in a numeric display, illuminating LEDs, transmitting operational commands and the like. This slower data is transmitted at a rate of 1 bit per 125 microsecond frame or 8 KHz. This bit, the so-called "signalling" bit, is serially received by the microcomputer M and successive bits are assembled into bytes. For reasons which will be explained below, one byte is assembled every 4 milliseconds for a byte rate of 250 Hz.

Simultaneously with the receipt of signalling bits the microcomputer M transmits signalling bits at the same 8 KHz rate on the output line SO. This enables the microcomputer to conduct a signalling dialog with a private branch exchange (PABX) or some other switch at the end of the telephone transmission line TL/RL.

In addition to the signalling input and output on lines SI and SO, respectively, the microcomputer is coupled to I/O devices such as an alphanumeric display AD, a special message detailed recording printer SMDR and two keyboards KL and KD. The keyboards KL and KD are interfaced to the microcomputer via a keyboard logic KLO. The display, keyboards and printer are connected to the microcomputer via a common data bus DB, address bus AB and control bus CB. These I/O devices are thus addressed and controlled by the microcomputer M and transmit or receive data to and from the microcomputer in the conventional manner. Additional I/O devices may also be connected to the microcomputer via the data, address and control busses.

The alphanumeric display AD may be a 16 character liquid crystal display for informing the operator of the telephone apparatus of telephone numbers, names and other messages. The keyboard KL may comprise line keys for selecting and indicating one of a number of telephone lines to which the telephone apparatus is connected and function keys for selecting and indicating functions such as "HOLD", and "I-USE". The I-USE function is described in the commonly owned U.S. patent application Ser. No. 196,685 filed Oct. 14, 1980 by John Holesha entitled "I-USE Indication in a Telephone Keyset".

The key dialpad KD may or may not be provided with LEDs on each key and is intended for use in dialing telephone numbers. It may also be used to input numerical information to the microcomputer if the latter is programmed for use as a calculator, for example.

In addition to the I/O devices referred to above, the microcomputer M is also connected to the telephone hook switch HSW and is thus informed whether the telephone apparatus is in the "on-hook" or "off-hook" condition.

The microcomputer M may be any commercially available single chip computer which is sufficiently fast and has sufficient ROM and RAM capacity to accomplish the necessary tasks. A suitable microcomputer for this purpose is the Intel 8049.

The software or firmware for the microcomputer M will depend upon the functions the microcomputer is intended to execute. Typical commands for the microcomputer which may be received from a private branch exchange (PABX) via signalling bits on the line SI and assembled into 8-bit signalling bytes are:

1. Ring (or beep) the telephone apparatus;
2. Select type of ring;
3. Flash an LED;
4. Select the LED (to be flashed);
5. Turn on an LED;
6. Select the LED (to be turned on);
7. Turn-off an LED;
8. Select the LED (to be turned off).

Each of the above commands are defined by one byte. Note that two successive bytes are used for a complete instruction.

Typical signalling bytes which are sent from the microcomputer to the telephone system define on-hook and off-hook conditions and indicate the selection of line, function and dial keys by the operator.

Figure 2:
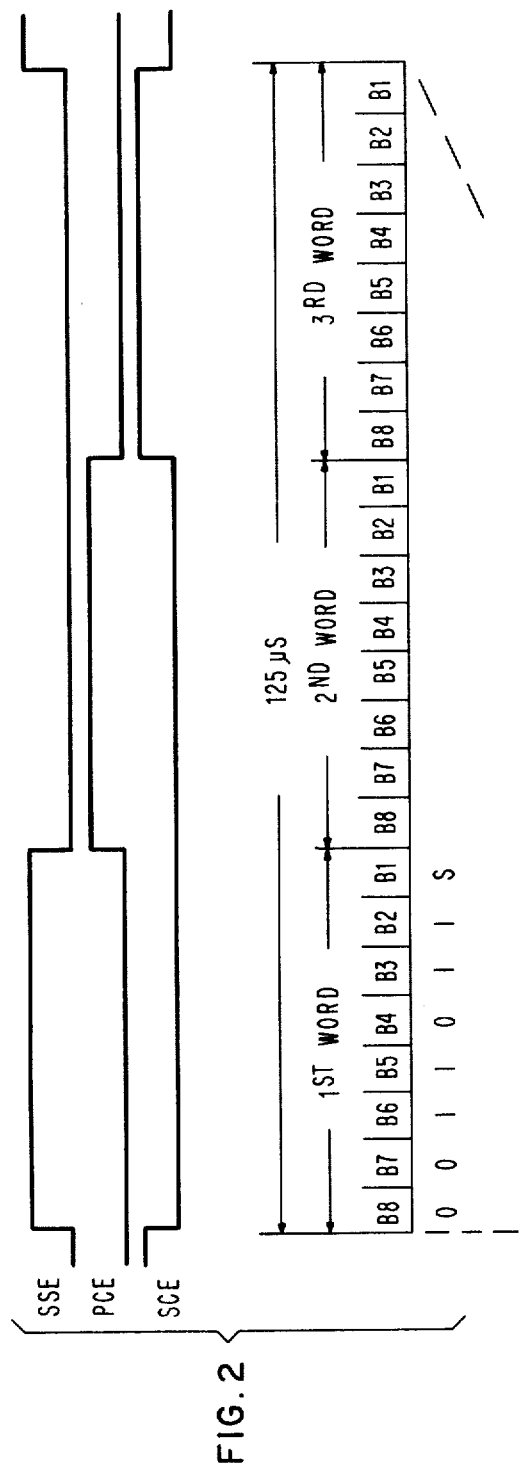
FIG. 2 is a timing diagram of a serial data frame employed in the apparatus of FIG. 1 and comprising three 8 bit words.

Frame format (FIG. 2,3)

FIG. 2 shows an example of a frame format which may be used in the telephone apparatus according to the present invention. This example illustrates that, in principle, there exists no limitation on the number of PCM words in a frame. The number of words depends only upon the data rate used in this system. Obviously the data rate in kilobits per second (KB/sec.) must be matched to the needed speed in the telephone system to which the telephone apparatus is connected. In particular, the frame pattern must be synchronous with the PCM frame timing. In the described system, a multiple of the standard 8 KHz sampling rate is used.

Given the 8 KHz sampling rate—that is, one sample every 125 microseconds—the number of words (samples) in each frame and the number of bits per word (sample) determines the frequency of the data pulses. Conventionally, each sample is defined by 8 bits or a byte of information. In the preferred embodiment of the present invention the number of samples per frame is two.

Clearly, there is an upper limit to the frequency with which digital pulses may be transmitted to and from, and processed by the telephone apparatus. In particular, this upper limit is defined by the nature and length of the transmission line and the speed of the individual components of the telephone apparatus such as the transceiver, the synchronizer and, especially, the microcomputer. The telephone apparatus according to the present invention is designed for use with a 4,000 foot cable comprising two conventional twisted pairs of wires.

The standard PCM data rate of 64 KB/sec. (that is, the 8 KHz sampling rate times 8 bits per sample) sets the lower limit on the data rate of the telephone apparatus according to the invention. In addition to the PCM data it is necessary to transmit both synchronization and signalling information. Finally, if permitted by the maximum data rate, it is desirable to transmit at least one additional PCM voice of serial data stream.

According to the present invention, the telephone apparatus simultaneously transmits and receives one "frame" of information every 125 microseconds; that is, the standard PCM sampling rate for telephone systems. Each signal frame is divided into at least two equal, 8-bit time slots: one time slot for the synchronization and signalling information and at least one, but preferably two time slots for separate, independent channels carrying PCM voice data and/or digital data. With three time slots, the data rate is 3×64 KB/sec. or 192 KB/sec.

Figures 12, 12A:
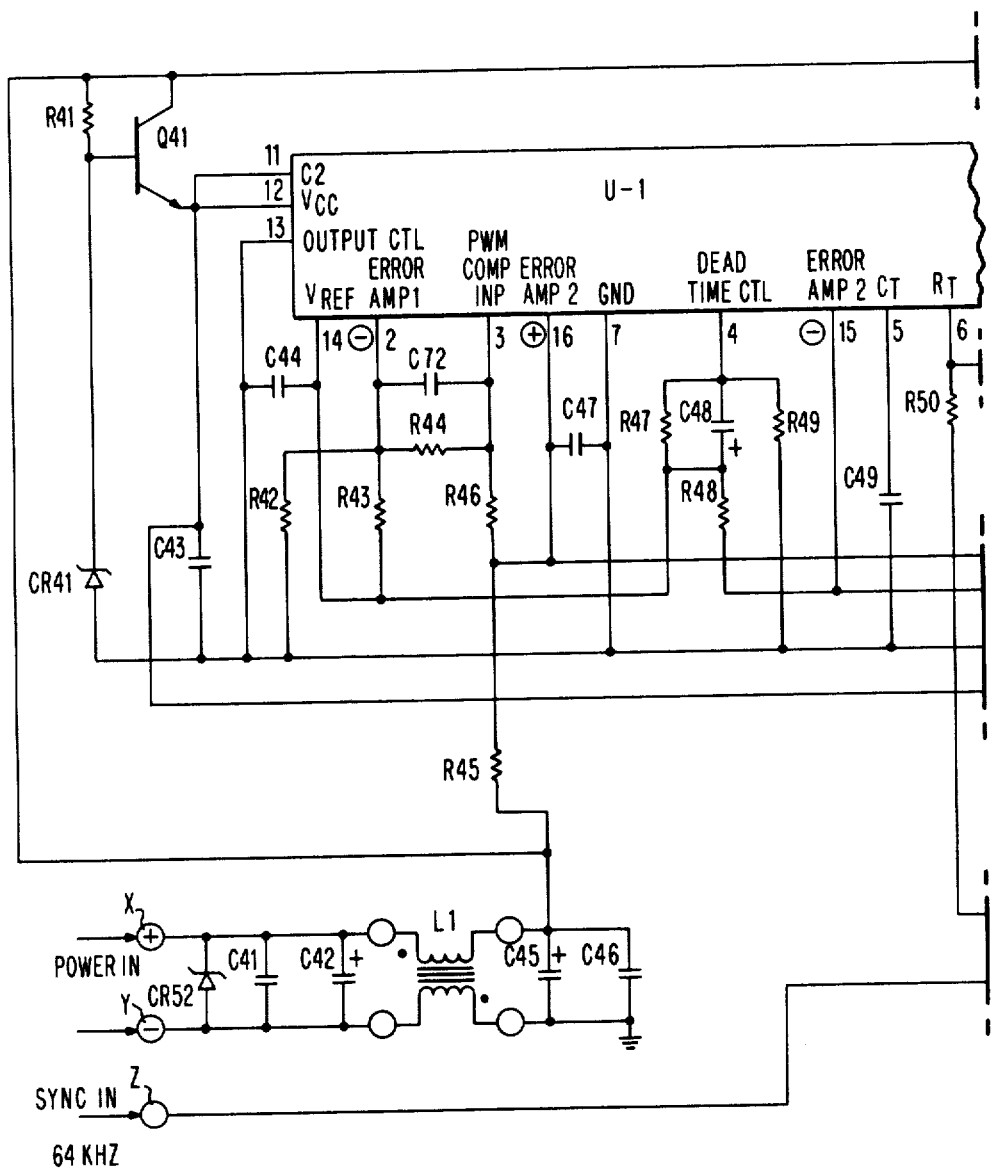
FIG. 12 is a block diagram and FIGS. 12A and 12B are a schematic diagram of the DC/DC converter shown in FIG. 1A.
Figure 12B:
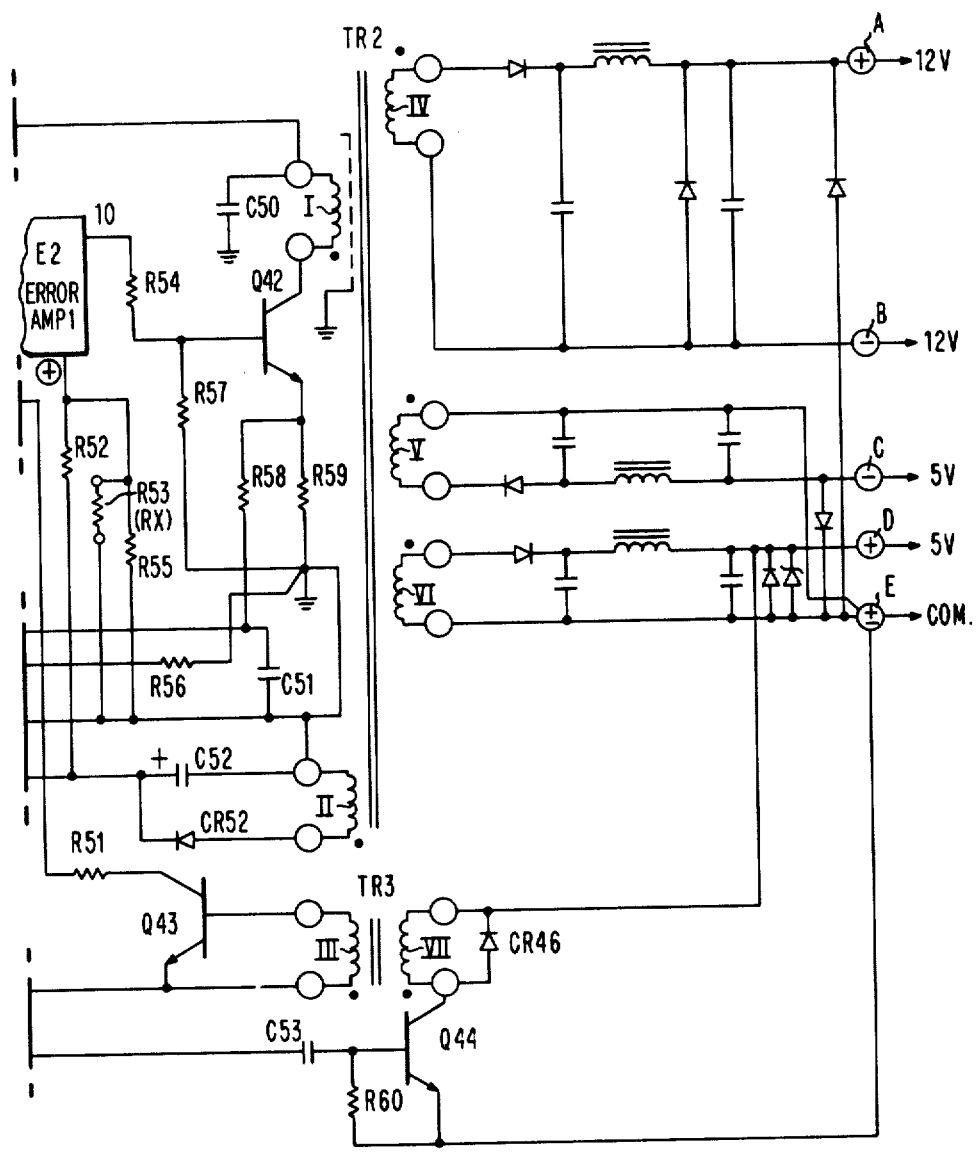

FIG. 12 shows the 125 microsecond frame divided into the three time slots. The three enable signals—sync/signalling enable SSE, primary channel enable PCE, and secondary channel enable SCE—are also shown to indicate their time relationship with the first, second and third words of the frame respectively.

The first seven bits (B8–B2) of the first word are set at the synchronizing code, which is preferably, alternately 0011011 and its inverse 1100100. The 8th bit (B1) in the first word, designated "S", is successively a start bit, one of 8 signalling bits and one of 23 stop bits.

The second word of the frame contains a single PCM speech sample of 8 bits (1 byte). The third word may contain either a PCM speech sample or a digital data word of 8 bits (1 byte). These second and third words are transmitted via the internal data bus IB of the telephone apparatus between the transceiver DTR and the primary codec/PCM filter (for the second word) and the secondary codec PCM filter or the DDI (for the third word).

It will be understood that the frame format may comprise only the first two words, or it may comprise more than three words, thus correspondingly increasing the number of transmission channels. If only two words are provided, the data rate will be 2×64 KB/sec. or 128 KB/sec. If more than three words are provided, the data rate must be correspondingly increased to permit transmission on each channel at the 64 KB/sec. rate.

Figure 3:
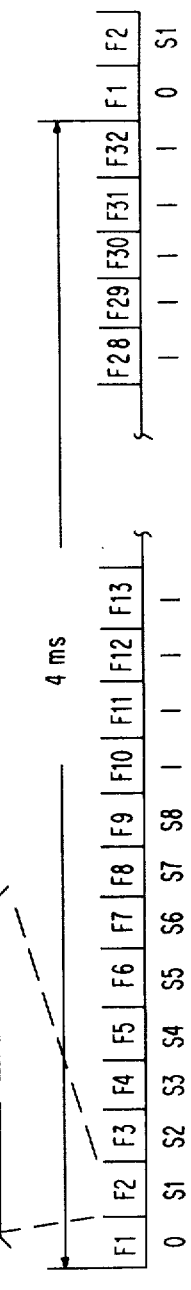
FIG. 3 is a timing diagram of a superframe employed in the apparatus of FIG. 1 and comprising 32 frames as shown in FIG. 2.

FIG. 3 shows a "superframe" of 32 frames, each identical to the frame shown in FIG. 2. Each superframe has a transmission time of 4 milliseconds.

The first frame F1 of the superframe contains a start bit or "0" in the B1 bit position of the first word. The next 8 frames contain the signalling bits S1,S2 . . . S8 in this bit position. The following 23 frames contain stop bits, or a "1", in the B1 bit position. With this arrangement, one signalling byte is transmitted to and from the microcomputer every four milliseconds. During the time that the frames F10–F32 are transmitted and received, the microcomputer has time to control other functions of the telephone apparatus.

As will be appreciated from the discussion above, the frame format according to the invention facilitates the transmission of two or more independent and simultaneous voice and/or data channels within one PCM frame and without any buffering. Consequently this format makes possible the provision of additional features, such as additional connections to peripheral units, without any change in the existing telecommunication system.

The frame format according to the invention also permits the extraction of a clock signal from the data information with no phase jitter thus allowing coherent operation between facilities.

Finally, the frame format provides optimized bandwidth for digital data transmission and alleviates out-of-band radio interference.

The Encoding Technique Using "Alternate Mark Inversion" (AMI) FIGS. 4–7

The alternate mark inversion (AMI) encoding technique has been used for digital trunk circuits with both PCM24 and PCM30 systems. If this encoding technique also is preferably employed in the digital telephone apparatus according to the present invention, this does not limit the basic architecture of this apparatus to such an encoding technique. It will become apparent from the later description of the receiver unit of the transmitter and receiver circuits that just relatively simple changes of the design have to be made for adjusting this circuitry to be used with different transmitting schemes, as for example, with the so-called "Ping-Pong" scheme. The choice of different encoding and transmitting schemes also is dependent upon requirements of the data rate to be achieved.

However, according to the present invention, the combination in using a specific frame formatting technique as herein described before and the AMI encoding scheme also allows transmitting of data together with voice information in a frame format of more than two channels. Therefore, a greater amount of extensions and other peripheral units can be connected to the switch in parallel. Furthermore, pairs of two-wire lines can be used which are balanced simply by twisting each two-wire line. Thereby, a greater cable distance between repeaters can be achieved and the cross-talk attenuation between the twisted pairs, which is decreasing with the frequency, is optimized.

In the AMI encoding scheme, basically a pulse is sent for every logical level "1" and no pulse is sent for a logic level "0". In addition to that simple "mark" and "no mark" scheme, the polarity of the pulse is inverted for every second logic level "1" which is sent. Furthermore, preferably the generated pulses approximate a raised cosine wave shape rather than a strict rectangular wave shape in order to minimize the influence of high order harmonics.

With recent advancements in the state of the art, telephone apparatus such as digital subscriber stations and digital attendant consoles have been developed in conjunction with electronic telecommunication systems, especially with key telephone systems and electronic private automatic branch exchanges typically using PCM techniques for speech digitalization with data rates in the range of 64 to 256 KHz. For such applications, varying cable lengths of up to 4,000 feet between the electronic switch and different subscriber sets are usually taken into consideration. With respect to these requirements, the chosen encoding scheme has the following advantages: the high cross-talk attenuation of pairs of twisted two-wire lines allows the use of commercially available and relatively inexpensive cables such as 25-pair cables which are especially useful in conjunction with multiple digital sucscriber sets. Even with the mentioned variety of cable lengths stemming from the different loop lengths in the range of up to 4,000 feet, the circuitry can be designed such that no adjustments in the transmitter/receiver circuits are required to accomplish transmitting information across those different loop lengths. This is very important with respect to small implementation and installation costs. The transceiver unit also can be implemented with small outlay and still meet FCC requirements, since with this encoding scheme commercially available and just a few hardware components are required which need no specific measures for ventilating and take up minimal space.

DIGITAL TRANSMITTER/RECEIVER UNIT (TRANSCEIVER) FIGS. 4–7

Figure 4:
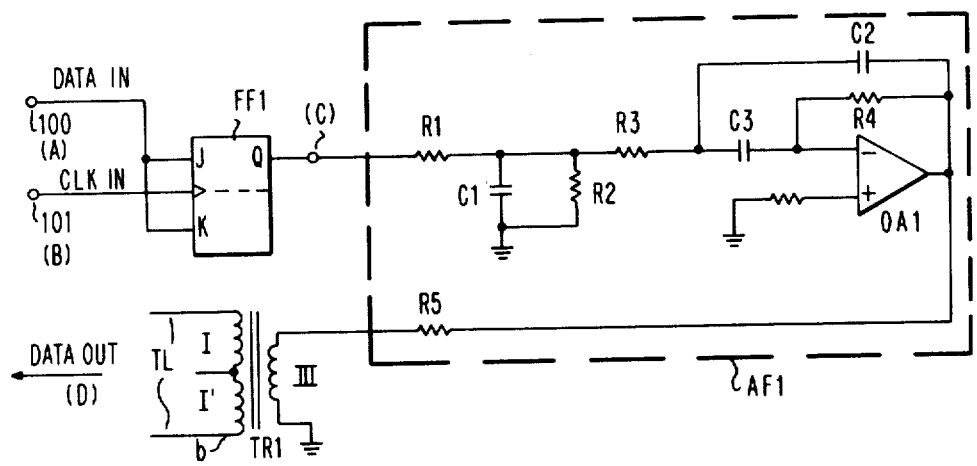
FIG. 4 is a schematic diagram of the transmitting portion of the digital transceiver shown in FIG. 1A.
Figure 5:
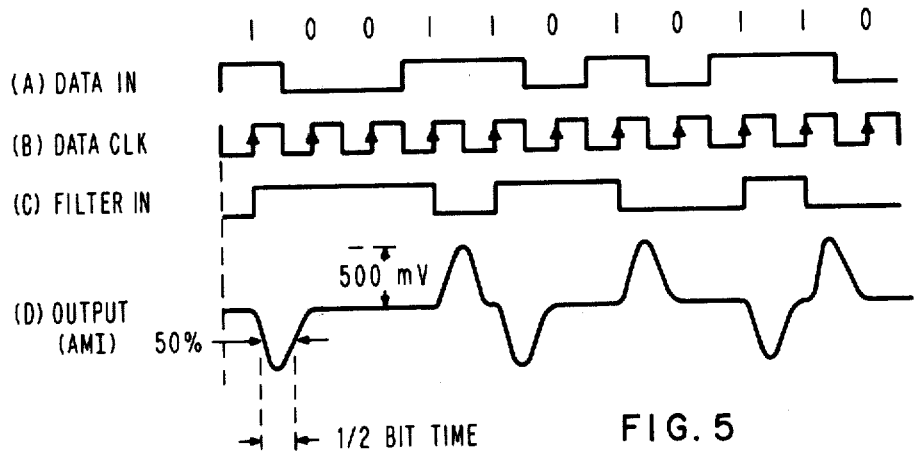
FIG. 5 is a timing diagram of a number of signals appearing in the transmitter shown in FIG. 4.
Figures 6, 6A:
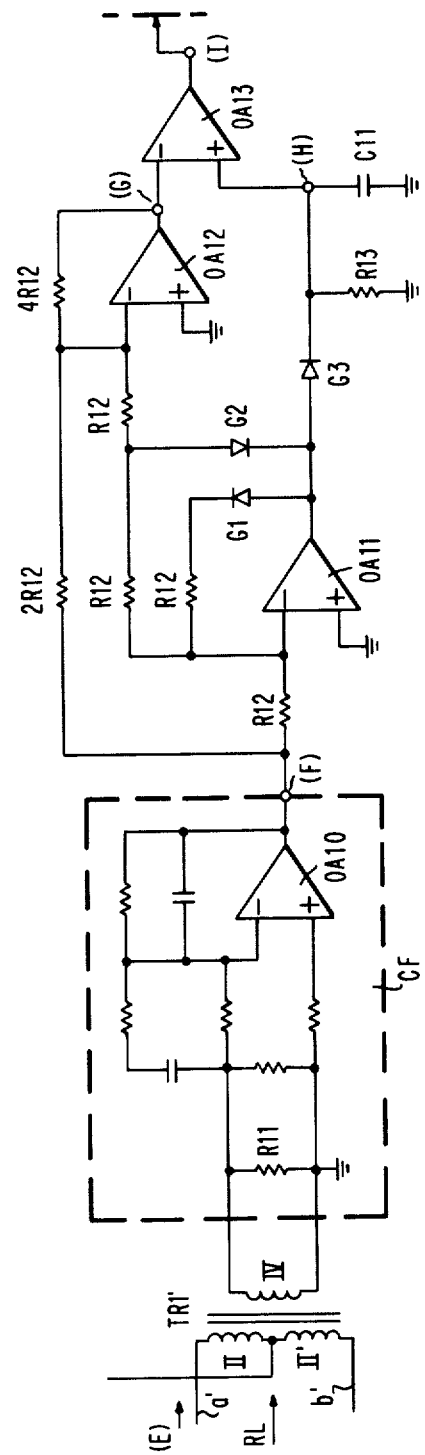
FIG. 6 is a block diagram and FIGS. 6A and 6B are a schematic diagram of the receiving portion of the digital transceiver shown in FIG. 1A.
Figure 7:
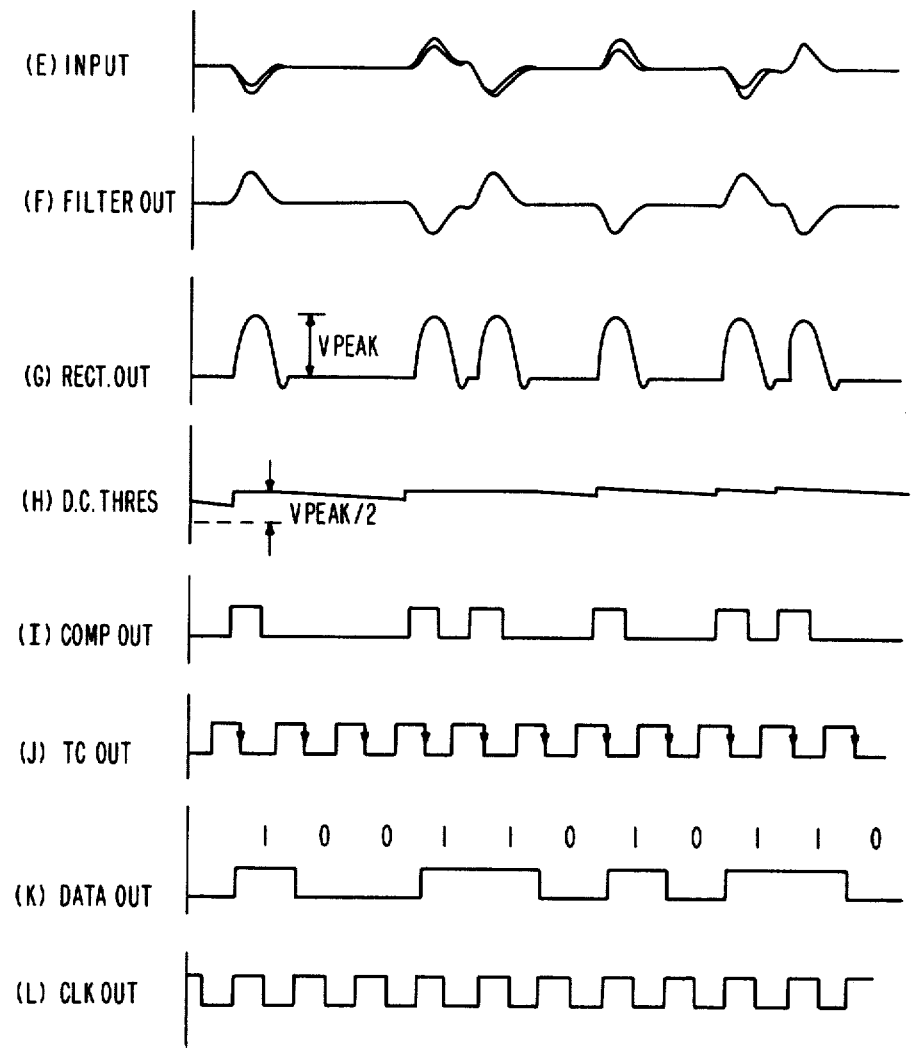
FIG. 7 is a timing diagram of a number of signals appearing in the receiver shown in FIG. 6A and 6B.

In the block diagram of the architecture of the digital telephone apparatus of FIG. 1, the digital transmitter/receiver unit DTR has been shown in one block; for a better comprehension this transmitter/receiver unit DTR has been broken down into a transmitter unit DT and a receiver unit DR which are shown in detail in FIG. 4 and FIG. 6, respectively. FIGS. 5 and 7 represent respective timing diagrams of the transmitter unit DT and the receiver unit DR. In conjunction with the description of the block diagram of FIG. 1, it has been pointed out that the digital transceiver DTR is connected to the four-wire transmission line by the transformer TR1 for transmitting digitalized voice data, other digital data information, signalling information, and last but not least, synchronizing bits via the two wires of the transmission line TL by use of the primary windings I, I' and the secondary winding III. For receiving the same items of information the two wires of the receiving line RL are connected to the primary windings II, II' and thereby coupled to the secondary winding IV of the transformer TR1'.

The schematic of FIG. 4 representing the transmitter unit DT also shows the primary windings I, I' and the secondary winding III of the transformer TR1 and the two-wire pair a, b of the transmitting line TL. The transformer TR1 has an impedance transformer ratio of 1:4.

Schematically indicated are a first input 100 for serially incoming data and a second input 101 for receiving data clock pulses. In view of the block diagram shown in FIG. 1, it has to be understood that these inputs 100, 101 represent the respective inputs of the digital transceiver DTR connected to the internal data bus IB, thereby receiving clock pulses and serial data from the primary and secondary codec PCM filters PCF and SCF, or from peripheral units such as the additional data system DDI.

The digital transmitter unit DT is provided with a JK flip-flop FF1 which is used as a toggle flip-flop, since both the J-input and the K-input of the flip-flop are commonly connected to the serial data input 100. The operation of the JK flip-flop FF1 is controlled by the train of data clock pulses received at the clock input 101. A normal Q-output of the JK flip-flop FF1 generates by means of the toggle function of the JK flip-flop data signals in the form of step functions in synchronism with the data clock pulse train. This characteristic is represented in the first three wave forms of FIG. 5. The reference symbols A through D at the left-hand margin are related to correspondingly labelled test points in FIG. 4 where these wave forms appear. Line A represents serially incoming data, line B the data clock pulse train and line C the data signals as generated at the Q-output of the JK flip-flop FF1. The wave forms of line A and line C represent the same series of items of data wherein each signal level "1" of the diagram in line C comprises a step function.

The output signals of the JK flip-flop FF1 have to be transformed into AMI encoded signals in the shape of a raised cosine wave form. This is achieved by a first active filter AF1 which is inserted between the output of the JK flip-flop FF1 and the secondary winding III of the transformer TR1. The active element of this filter is a first operational amplifier QA1 having an RC input network and a multiple feedback circuit. By means of this implementation the filter represents a shaping filter with a 1 pole band pass characteristic and a one-pole low-pass characteristic, which attenuates the higher order harmonics of the input signal. The values of the filter components are selected in conventional manner such that the open loop gain of the operational amplifier QA1 is at least 30 dB at data rate frequency. The positive and negative pulses are extremely symmetrical and approximate raised cosine pulses having a level of about 4 volts peak-to-peak at the output of the active filter AF1. The pulses are one-half of a bit time wide at their 50% amplitude points for optimum data recovery and clock reconstruction at receive end.

The output transformer comprising the secondary winding III and the first primary windings I, I' provides a means for feeding or receiving direct current power over the transmission line TL; this design is such that 40 dB longitudinal balance over the range of 20 KHz to 200 KHz is obtained. This prevents the transmission line from acting like an antenna. The wave form of the signal fed to the transmission line TL via the secondary winding III and the primary windings I, I' is represented in line D of FIG. 5. This pulse diagram shows all the characteristics of data signals to be transmitted via a transmission line TL. The binary information is AMI-encoded and the basic wave shape is formed such that the pulses resemble raised cosine wave forms rather than rectangular pulses. As pointed out, the pulses are about one half of a bit time wide between the two 50% amplitude values, whereas each pulse in general is smaller than the full bit time such that the transfer of positive and negative pulses is achieved properly.

The second main unit of digital transceiver DTR forms the receiving part for processing the receiving data signal train. The main objects of this receiver unit DR are to recover from the incoming signal information a precise, stabilized clock pulse train and to detect the digital data information and convert it into the form of a bipolar, rectangular wave shape.

Figure 6B:
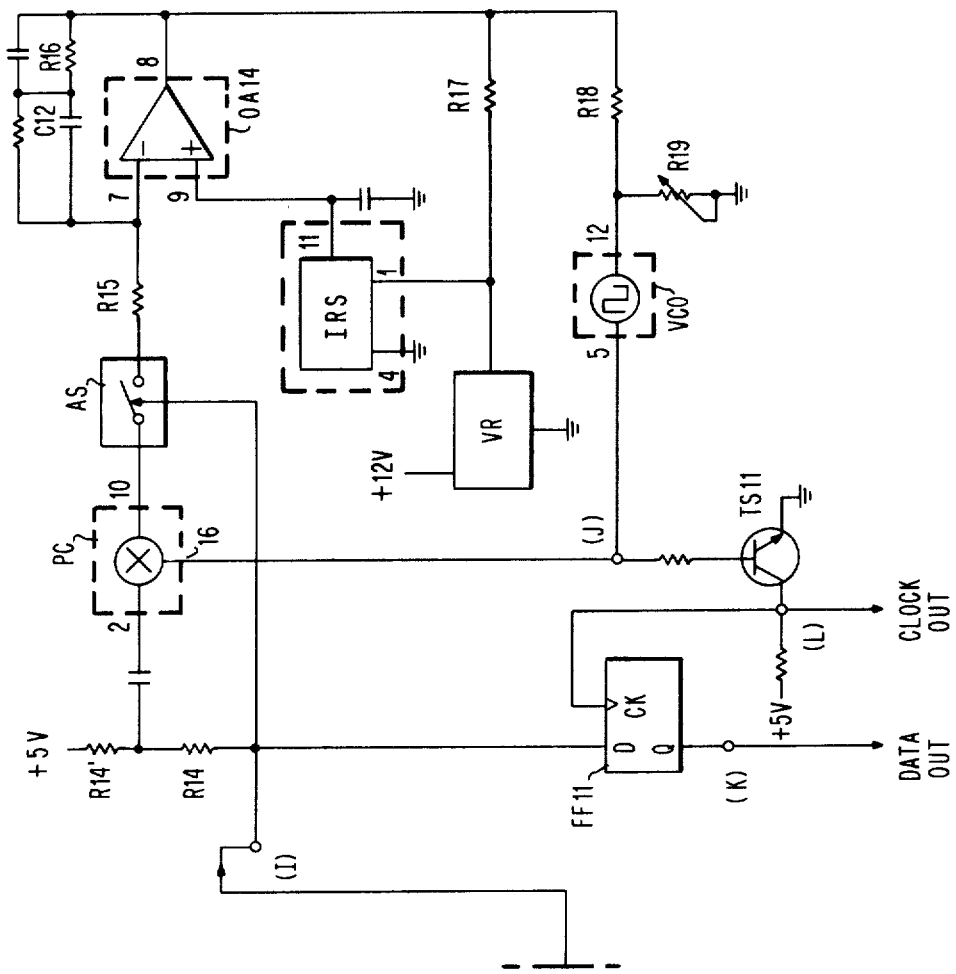

The detailed circuit diagram of the receiver unit is shown in two related FIGS. 6a and 6b. The arrangement of both figures with reference to each other is schematically indicated in FIG. 6.

At the left-hand margin of FIG. 6a there is represented the transformer TR1' with the primary windings II and II' and the secondary winding IV. The second primary windings are connected to the two wires a' and b' of the receiving line RL. The transformer has the aforementioned impedance transforming ratio of 1:4. All information received across the two wire pair a', b' of the receiving line RL is supplied to a compensation filter CF which is designed for eliminating distortions of the received digital signals and minimizing out-of-band interference. The clean signal pulse train will then be processed furthermore in a pulse detector circuit including a full wave rectifier, an AC/DC converter and a comparator. In FIG. 6b it is shown that the output signals of the comparator are supplied to a D flip-flop forming the output stage for the serial digital data stream on the one hand and to a sampling circuit for recovering a clock pulse train.

A detailed description of the different components of the receiving unit DR of the digital transceiver DTR will now be given with reference to FIGS. 6a and 6b, respectively, in conjunction with timing diagrams shown in FIG. 7 which refer to different wave forms of signals appearing at specific test points of the circuitry which are referenced by letters E through L. It has been pointed out that different loop lengths of up to 4,000 feet between the electronic switch and different subscriber sets have to be taken into consideration. According to this variety of loop lengths the signal pulse train which is received from the receiving line RL is more or less distorted. The timing diagram E in the first line of FIG. 7 represents such an input signal pulse train in a wave shape as it occurs at the input side of the transformer TR1'. The wave shapes of the signals in the timing diagram E are shown in full lines with with varying amplitudes thereby indicating that amplitudes and wave shapes may vary dependent upon the history of the received signal. For obtaining a more general understanding it may be mentioned that the transmission line for the digital signals, here represented by the receiving line RL, tends to attenuate high frequency components, and therefore, has to some extent a characteristic of low-pass line.

Matching these input conditions, the compensation filter CF is designed as an active filter including another operational amplifier OA10. In the input circuitry of this operational amplifier there is arranged in parallel to the secondary winding IV of the transformer TR1' an impedance transforming resistor R11 which is grounded at a connector tap coupled to the non-inverting input of the operational amplifier OA10. The remaining parts of the input network of the second operational amplifier OA10 form a RC network of relatively high impedance which has basically low-pass characteristics. A multiple feedback circuit of the operational amplifier OA10 primarily consists of a parallel RC circuit which results in a high-pass feedback. This design conventional to those familiar with active filters provides a compensation filter CF with a characteristic having at least to some extent a gain in the frequency range of up to 100 KHz and creating a small loss at higher frequencies of up to 200 KHz. Thereby, maximum performance is achieved in this frequency band. At the output of the operational amplifier OA10 which is identical with the output of the compensation filter CF, an undistorted inverted output signal pulse train occurs. This wave form is shown in the second line of FIG. 7 as indicated by the reference symbol F.

The following sub-unit of the receiver part of the digital transceiver above all serves to convert the bipolar output signals of the compensation filter CF into unipolar rectangular pulses. There is arranged a third operational amplifier OA11 having an input load resistor R12 and a first and a second feedback circuit each including another resistor R12 connected in series with a diode G1, G2, respectively. Both diodes are connected in anti-parallel to the output of the operational amplifier QA11. This implementation is such that for both positive and negative values of the input signal the operational amplifier just operates as an inverting switch.

The connecting point between the second diode G2 and the second feedback resistor R12 furthermore is coupled to another load resistor R12 connected to the inverting input of a fourth operational amplifier OA12. The non-inverting input of this operational amplifier is grounded. The inverting input of this operational amplifier OA12 also is connected by another resistor 2R12 to the output of the compensation filter CF on the one hand and to a feedback circuit including a further resistor 4R12 on the other hand. As indicated by means of the reference symbols of the resistors the circuit implementation is such that the resistances are multiple integrals, this is by the way of an example, if R12 equals 5 K$\Omega$, then 4R12 will be 20 K$\Omega$.

The operational amplifier arrangement forming a full wave rectifier is implemented in a conventional manner and is relatively straightforward. An analysis of the circuit, therefore, is relatively easy to those skilled in the art. A positive-going input signal occurring at the output of the compensation filter CF drives the output of the third operational amplifier OA11 negative and the second diode G2 becomes conductive. The opposite applies to an input condition when a negative-going pulse occurs. The basic amplification factor of the rectifying operational amplifier OA12 in both cases is determined by the ratio of the feedback resistor 4R12 and the respective effective resistors of the input circuit of this operational amplifier and has an absolute value of 2. The only difference is that the output signal is in phase with a positive-going input signal whereas the output signal is out of phase by 180° when the input signal is negative. Thus, a unipolar signal train is generated at the output of the rectifying operational amplifier OA12 which is represented by the wave forms in line G of FIG. 7.

The third operational amplifier OA11, furthermore, has a specific object in conjunction with an output circuit including a third diode G3 connected by its anode to the cathode of the second diode G2 and including a parallel RC circuit comprising a further resistor R13 and a capacitor C11 which are connected to ground. The values of this RC circuit are chosen such that a fairly high time constant is established which generates a variable DC threshold signal at the cathode of the third diode G3. The wave form of this threshold signal is shown in line H of FIG. 7.

This threshold signal is applied to the non-inverting input of a voltage comparator OA13 whose inverting input is connected to the output of the rectifier stage, that is, the output of the fourth operational amplifier OA12. The voltage comparator OA13 thus forms a pulse detection stage under control of a variable DC threshold voltage which is kept at one-half the peak amplitude of the unipolar pulses occurring at the output of the rectifying operational amplifier OA12 and represented in line I of FIG. 7. Thus, within a relatively wide dynamic range of about 20 dB the detector generates, in case of an input signal which represents a signal level "1", a pulse of a length of one half of a bit time.

It should be indicated that the performance of the pulse recovering scheme, at least to some extent, is dependent upon the characteristics of the diodes involved. These diodes have relatively low reverse leakage and moderately fast switching characteristics. The first diode G1, as well as providing feedback to the second operational amplifier OA11 on positive output swings, balances the voltage drop at the third diode G3, thereby achieving linear tracking between the threshold voltage and the peak amplitude of the unipolar pulses at the inverting input of the comparator OA13.

The circuit shown in FIG. 6b which is connected to the output of the voltage comparator OA13 (shown in FIG. 6a) mainly has the object to reconstruct the 192 KHz clock and to generate an output data pulse train synchronized with the clock. Prior to a detailed description of the respective circuitry it may be useful to analyze the signal pulse train occurring at the output of the voltage comparator OA13 for obtaining a better background understanding of the purpose of this circuitry.

The output signals of the comparator stage as shown in line I of FIG. 7 represent rectangular pulses of a signal level "1" in a random order. Since "zero" bits in the stream of data are not accompanied by a change of the signal level, the clock pulse has to be recovered entirely from the pulses representing data bits with signal level "1". Long strings of data bits with signal level "0", therefore, are a worst case which has to be taken into consideration and which must not affect the clock recovering scheme. For implementing the clock recovering scheme a phase-locked loop circuit is employed which is designed for sampling each consecutive pulse at the output of the fifth operational amplifier OA13 and for maintaining signal condition without any change until the next pulse occurs. This simply means that the information between two consecutive pulses is skipped by a sampling circuit.

A series of pulses occurring in a random order in view of its frequency spectrum also is a relatively complex subject matter. It may be well understood by those skilled in the art that a poorly designed phase-locked loop circuit in this situation could be locked onto a frequency which is higher or lower than the 192 KHz pulse train. The clock frequency, however, is the far most significant frequency in the spectrum of a continuous string of data bits of signal level "1". To maximize the energy in the spectrum at the clock frequency of the transmitted signal the compensating filter and the pulse detection stage have been designed such that the pulse at the output of the voltage comparator OA13 are approximately one-half the bit time wide.

Based upon this introduction the clock reconstruction circuit will now be described in detail with reference to FIG. 6b. The output of the pulse detection stage represented by the voltage comparator OA13 is connected via a voltage divider comprising further resistors R14 and R14' to supply voltage, on the one hand, and to the information input of a D flip-flop FF11 on the other hand. A connector tap of both resistors R14 and R14' is coupled via a further capacitor to an input of a quadrature phase comparator PC having an output labelled 10 and a control inpt 16.

The output is connected to the inverting input of a fifth operational amplifier OA14 via an analog switch AS and an input resistor R15. The analog switch is controlled by the output signal of the fifth operational amplifier OA13. The fifth operational amplifier OA14 is provided with a multiple feedback circuit including a further capacitor C12 and a further resistor R16 which are arranged in series. A small capacitor is in parallel with resistor R16 to filter mixer harmonics present in the output of phase comparator PC. A very large value resistor in parallel with capacitor C12 provides a DC path to the inverting input of the amplifier OA14 when the analog switch AS is opened. Thus, the fifth operational amplifier OA14 and its feedback network operate as an integrator, straight amplifier, or low pass filter depending on the frequency of the input signals passed to the inverting input of the fifth operational amplifier OA14. The non-inverting input of the fifth operational amplifier OA14 is supplied with a DC signal generated by an internal reference source IRS. The output of the operational amplifier OA14 is coupled by a further series resistor R16 to a current control oscillator CCO which output also is directly connected to an input of the internal reference source IRS. The output of the sixth operational amplifier OA14, furthermore, is connected to ground via a further resistor R17 and an adjustable resistor R18 which are arranged in series. The connector tap between both resistors is linked by a threshold circuit TC to the control input of the phase comparator PC and, in addition to it, to the base of a transistor TS11 having a grounded emitter and a collector forming an output of the recovered clock pulse train.

It may be mentioned that the devices of this phase recovering circuit are entirely composed of commercially available components and integrated circuits. In fact, the phase comparator PC, the operational amplifier OA14, the internal reference source IRS and the voltage controlled oscillator are integrated together into one phase-locked loop device manufactured by EXAR as its device 2212. This is indicated in the drawing by blocks in dotted lines and by pin reference symbols of the manufacturer. The voltage regulator VR can be implemented by a device 78L05 of National Semiconductor Corporation.

It is, therefore, deemed not to be necessary to describe the function of this pulse recovering scheme in all details, since the basic requirements and the mode of operation to be achieved have been explained in the introductory section of this circuit. Some special characteristics, however, will be pointed out in the following.

The analog switch AS is closed whenever a pulse representing a data bit of signal level "1" occurs at the output of the voltage comparator OA13. Thereby the output of the comparator PC is sampled and the phase error sample is applied to the input resistor R15 connected to the inverting input of the fifth operational amplifier OA14. Amplifier OA14 in turn changes capacitor C12 for a duration of time equal to the width of the error sample with a direction determined by the polarity of the error sample. The voltage across C12 changes the frequency of the voltage controlled cosillator VCO in a direction which minimizes the phase error. The zero phase error point for the combination of the quadrature phase comparator PC and the analog switch AS occurs when the positive transistion of the voltage controlled oscillator output is in the middle of the output pulses from the voltage comparator OA13. This timing, in turn, is the optimum time for deciding whether a data pulse having a signal level "1" at the output of the voltage comparator OA13 has occurred.

The output signal of the sixth operational amplifier OA14 is applied to a resistor network including resistors R18 and R19. Resistor R19 determines the center frequency of the phase-locked loop circuit by means of the voltage drop across the resistor which voltage is effective at the input of the threshold circuit TC. The series resistor R18 then specifies the upper and lower boundaries, or, in other words, the maximum deviation from the center frequency.

The output signal of the voltage controlled oscillator VCO as indicated by the reference symbol J is represented in the wave form of line J of FIG. 7. This signal is applied to the control input of the phase comparator PC and is amplified and, above all, inverted by means of the transistor TS11. The transistor output signals form the recovered clock pulse train which is shown in line L of FIG. 7. This clock pulse train also is used to control the D flip-flop synchronizing the stream of data bits occurring at the output of the comparator stage with the recovered clock pulse train.

Figure 8:
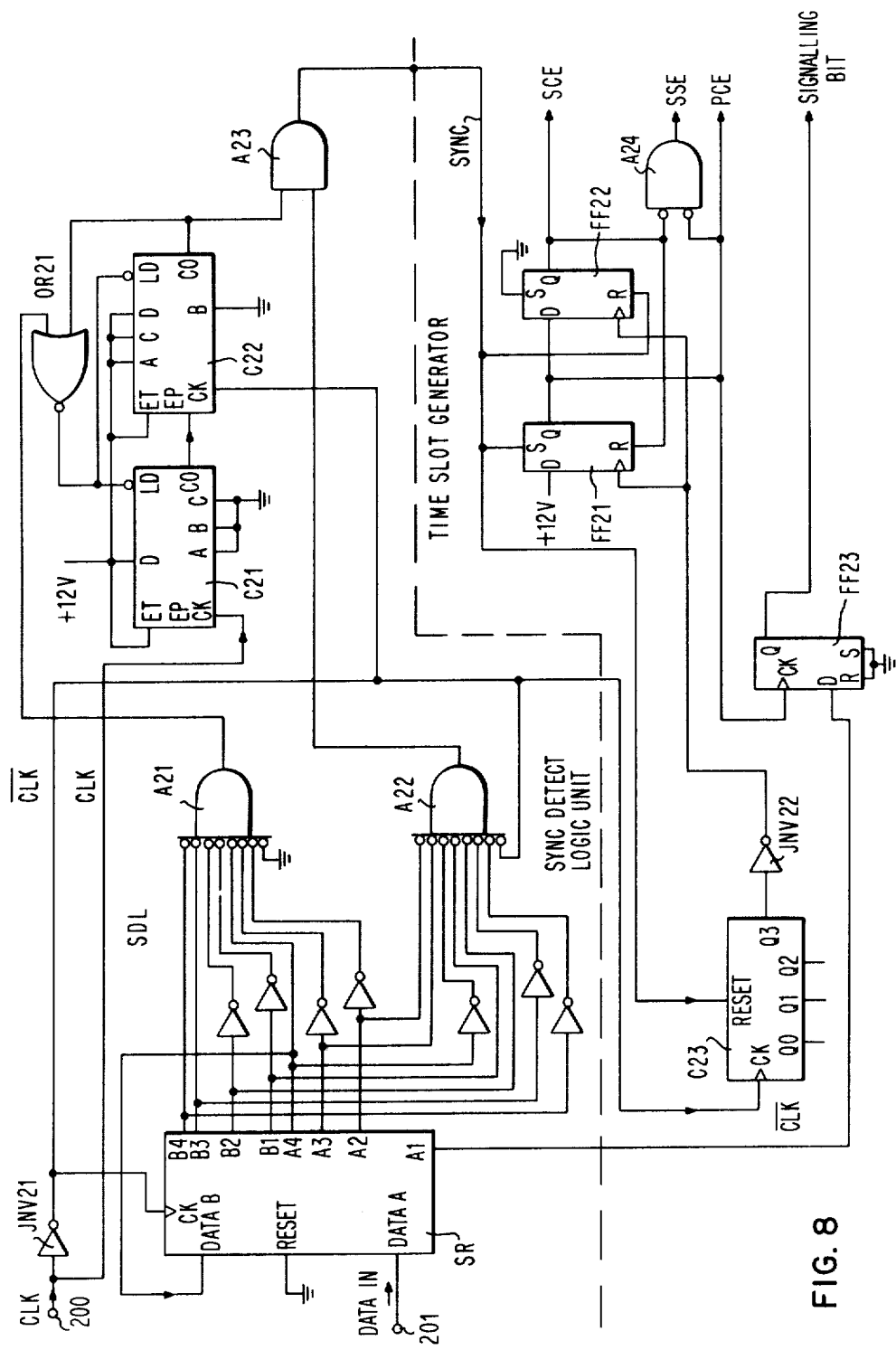
FIG. 8 is a schematic diagram of the serial frame synchronizer shown in FIG. 1A.
Figure 9:
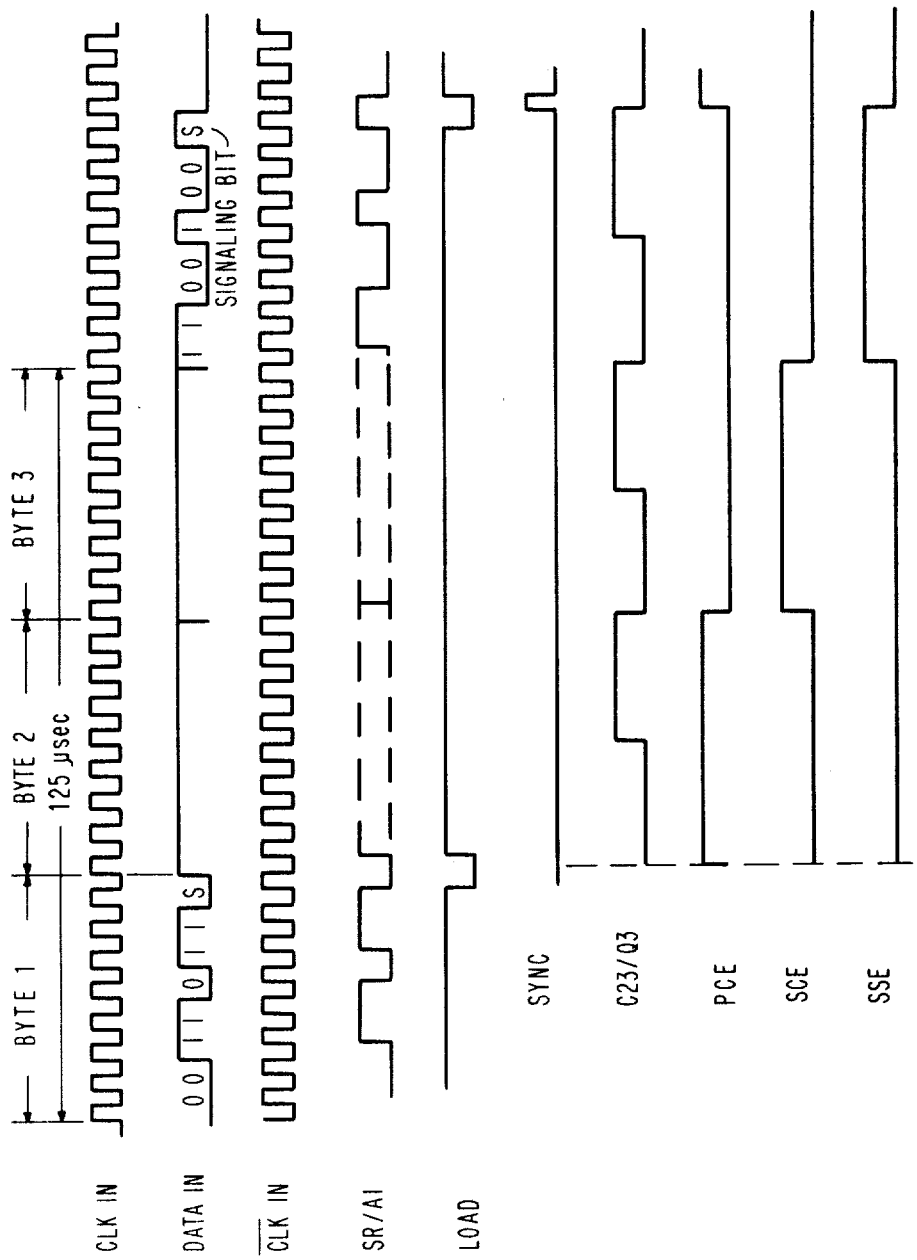
FIG. 9 is a timing diagram of a number of signals appearing in the serial frame synchronizer shown in FIG. 8.

Serial Frame Synchronizer SFS (FIGS. 8, 9)

It has been pointed out that the serial data rate, employed in the digital telephone apparatus according to the present invention, is 192 Kbit/sec. With reference to FIGS. 2 and 3, it has been described that each serial data frame format includes three bytes, each comprising eight bits. In each frame format one of these bytes has the characteristic of the synchronizing/signalling byte composed of seven synchronizing bits and a signalling bit.

By means of the synchronizing bits, the frame formats of a continuous serial data stream can be detected by the serial frame synchronizer SFS. By evaluating the time of the occurrence of the synchronizing bits within the serial data stream the three bytes of a frame format which are identified and transmitted independently of each other are identified. For this reason the seven bit code which consists of the synchronizing bits has to have very low correlation with any encoded data information neither normal data information nor an idle channel code. Statistical studies have proved that the bit series of 0011011 does follow these requirements. Accordingly, the inverted synchronizing bit code comprises of the series 1100100.

The serial frame synchronizer is mainly composed of three sub-units, a serial-to-parallel converter for converting the information received at the serial data stream into a parallel 8-bit format, a logic unit for continuously evaluating the current state of the serial-to-parallel converter and a time slot generator for producing under control of a synchronizing pulse three output signals each occurring concurrently with a respective one of the three bytes of a frame.

In accordance with the block diagram of FIG. 1, the serial frame synchronizer SFS receives a 192 KHz clock at a clock input 200 and serial data at a data input 201. Forming the serial-to-parallel converter in the serial frame synchronizer SFS there is arranged a shift register SR. The shift register SR is implemented as a double four-bit shift register with two corresponding serial data inputs DATA A and DATA B, respectively and two sets of four parallel outputs A1 through A4 and B1 through B4. These two four-bit shift registers are cascaded by short-circuiting the most significant output A4 of the first stage with the second serial data input DATA B. The first serial data input DATA A is connected to the data input 201 of the serial frame synchronizer SFS. The operation of the shift register SR is controlled by clock signals $\overline{CLK}$ which are inverted by an inverter I21 with respect to the clock signal pulse train CLK supplied to the clock pulse input 200. For detecting the seven synchronizing bits of a frame format there is arranged the synchronizing detect logic unit at the output of the shift register SR. It comprises a straight-forward logical network composed of a series of inverters and two AND-gates A21 and A22. Each of the inverted inputs of the AND-gates is coupled to a respective one of the most significant parallel outputs A2 through A4 and B1 through B4 of the shift register SR either directly or by one of the inverters. The AND-gates A21 and A22 thus are all zero detectors and are alternatively supposed to be operative if the current state of the shift register SR reflects either the normal or the inverted synchronizing bit pattern.

It has been described hereinbefore that consecutive frames have the characteristic that alternatively a normal and the inverted synchronizing bit pattern occurs. For fail-safe operation, it is now evalutated that for two consecutive frames both the normal and the inverted schronizing bit pattern occur within a given distance determined by the data frame format. This is achieved by counting the clock pulses occurring after having detected one of the synchronizing bit patterns and by evaluating the status of the shift register SR one pulse frame later if then the inverse synchronizing bit pattern is present.

To perform this operation there is arranged at 24-bit counter in accordance with the chosen frame format which is implemented by means of two cascaded 16-bit counters C21 and C22. The first counter C21 is controlled by the 192 KHz clock signal CLK received at the clock pulse input 200 of the serial frame synchronizer SFS. It produces a carry output signal at its carry output CO when the maximum count is reached. This output signal is fed as a count-enable signal to a count enable input EP of the second counter C22 which is controlled by the inverted clock pulses $\overline{CLK}$. Both counters are preset in common to a predetermined starting count by a preset signal applied in parallel to their load inputs LD. This preset signal is generated at the output of an OR-gate OR21 having two inputs each connected to a respective one of the outputs of the first AND-gate A21 and the carry output CO of the second counter C22. Thus, an output signal at the carry output CO of the second counter C22 occurs whenever 24 bits of the 192 KHz clock pulse train have passed. In other words, the signal condition of the first AND-gate A21 detecting a synchronizing bit pattern is buffered for exactly one pulse frame and is then appearing at the carry output CO of the second counter C22.

At this time, the second AND-gate A22 of the synchronizing detector logic unit is supposed to carry a signal of signal level "1", if the bit pattern occurring one pulse frame earlier in fact was a synchronizing bit pattern. The signals occurring at the carry output CO of the second counter C22 and the second AND-gate A22 are logically linked by a further AND-gate A23 which produces an output signal of signal level "1" occurring exactly once after each series of 48 pulses of the 192 KHz clock pulse train CLK. This output signal of the AND-gate A23 is the synchronizing signal SYNC locking the serial data stream to the correct frame format.

The described circuit is implemented with a minimum of hardware and has a very high noise immunity. Once both synchronizing bits in form of the output signals of the AND-gates A21 and A22 are detected, the circuit remains locked with these synchronizing bits. The only time that the circuit may lose synchronization is when the synchronizing signal is slipped. But any noise associated with the synchronizing bits will not cause the circuit to loose synchronization once the synchronized status is detected.

The synchronizing signal SYNC controls the time slot generator for locating the three different bytes in a frame by means of the three timing signals "Synchronizing/Signalling Enable" SSE, "Primary Channel Enable" PCE, and "Secondary Channel Enable" SCE. Each of these signals occurs one after the other and specifies during its signal level "1" a time period for the occurrence of a respective one of the three bytes of a frame.

For obtaining this operation the time slot generator is provided with a further 8-bit counter C23 which receives the inverted clock pulses $\overline{CLK}$ at its clock input. The counter is designed as a divide-by-eight counter and produces at its Q3 output a 24 KHz pulse train which is inverted by a further inverter I22 and, in common, applied to clock inputs of two further D flip-flops FF21 and FF22. A Q-output of the first flip-flop FF21 of the time slot generator is connected to the D-input of the second flip-flop FF22. The Q-output of the second flip-flop FF22 is connected to the reset input of the first flip-flop FF21 of the time slot generator. Thus, resetting of the first flip-flop FF21 is accomplished whenever the second flip-flop FF22 is set.

As will be explained in the following the first flip-flop FF21 in its set condition generates the primary channel enable signal PCE whereas the second flip-flop FF22 in its set condition carries the secondary channel enable signal at its Q-output. Both signals are applied to a respective one of the inverted inputs of a further AND-gate A24 which is operative if both the primary channel enable signal PCE and the secondary channel enable signal SCE are at signal level "0". Thus, the output signal of this further AND-gate A24 generates the sync-/signalling enable signal SSE.

In the time slot generator there is provided a further D flip-flop FF23 having a data input D connected to the least significant output A1 of the shift register SR and a clock input which is connected to the Q-output of the first flip-flop FF21 of the time slot generator. The D flip-flop FF23 operates as a synchronizer for detecting the signalling bit which is present at the least significant output of the shift register at a time concurrently with the rising edge of the primary channel enable signal PCE.

The operation of the serial frame synchronizer which implementation has been described hereinbefore will now be pointed out with reference to various timing signals shown in FIG. 9. The first line represents the 192 KHz clock pulse train CLK as applied at the clock input 200 to the serial frame synchronizer SFS. The stream of serially incoming data which is received at the data input 201 of the serial frame synchronizer is shown in the second line of FIG. 9. In the left hand and the right hand margin of this pulse train is assumed that two consecutive patterns of synchronizing bits appear. Derived from this signal condition, the alignment of the frames is indicated on top of FIG. 9. The third line of FIG. 9 shows the wave form of the clock pulse train in inverted form which is referenced as $\overline{CLK}$.

These three pulse trains form the input signals of the serial frame synchronizer SFS from which signals all the remaining wave forms shown in FIG. 9 are derived. The fourth line of FIG. 9 represents the operation of the shift register SR by means of the output signal occurring at the least significant output A1 of the shift register SR. As to be seen from comparison with the data stream shown in line 2, the output pulses have a delay of half the bit time which is resulting from controlling the shift register SR by the inverted clock pulses $\overline{CLK}$. In the fourth line there is shown the timing of the load pulses applied to the counters C21 and C22 which pulses are produced at the output of the OR-gate OR21. These signals occur if the signal pattern at the most significant outputs A2 through A4 and B1 through B4 of the shift register SR reflects the synchronizing bit pattern. The signals also can be determined by the carry output signal of the second counter C22 of the serial frame synchronizer. These signals occur in a synchronized mode of operation every 24 bits of the inverted clock pulse train $\overline{CLK}$.

The sixth line shows the timing of the synchronizing bit SYNC which is identical with the output signal of the AND-gate A23. This signal is applied to both a reset input of the third counter C23 and the set input of the first D flip-flop FF21 of the time slot generator. Thus, the third counter C23 is reset to zero and will carry an output signal at its Q3-output eight clock pulses later. At the same time the first D flip-flop FF21 is set thereby generating at its Q-output the primary channel enable signal PCE. The next "1" to "0" transition of the output signal of the third counter C23 enables the second flip-flop FF22 of the time slot generator to load the data information applied to its data input D. The second flip-flop in its set condition generates the secondary channel enable signal SCE and a reset signal for the first flip-flop FF21. Thereby it is accomplished that the next following transition from "1" to "0" level of the output signal of the third counter C23 cannot reactivate the first flip-flop FF21 which status, therefore, remains unchanged for two consecutive clock pulses.

The same clock pulse however which is blocked at the first flip-flop FF21 drives the second flip-flop FF22 into its reset state. Thereby, the secondary channel enable signal is turned off and furthermore the first flip-flop FF21 of the time slot generator becomes unlocked and can be set again by means of the following clock pulse. Since both flip-flops FF21 and FF22 are thus reset for a period of eight 192-KHz-clock pulses between the trailing edge of the secondary channel enable signal SCE and the rising edge of the primary channel enable signal PCE, the sync/signalling enable signal SSE will be generated at the output of the AND-gate A24. The timing of the three enable signals PCE, SCE and SSE may be obtained from lines 8–10 of FIG. 9.

Figure 10:
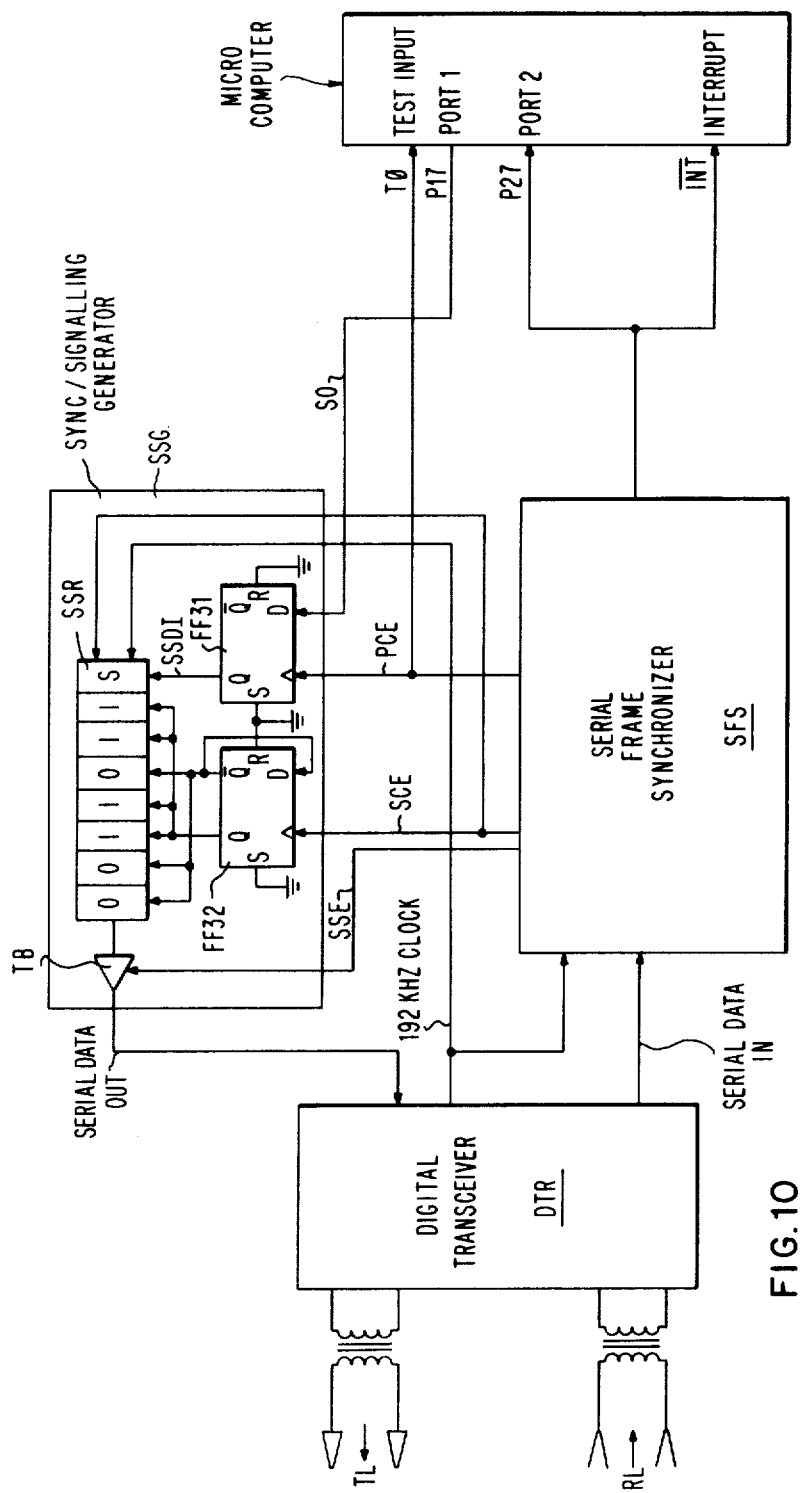
FIG. 10 is a schematic diagram of the sync/signalling generator shown in FIG. 1B.
Figure 11:
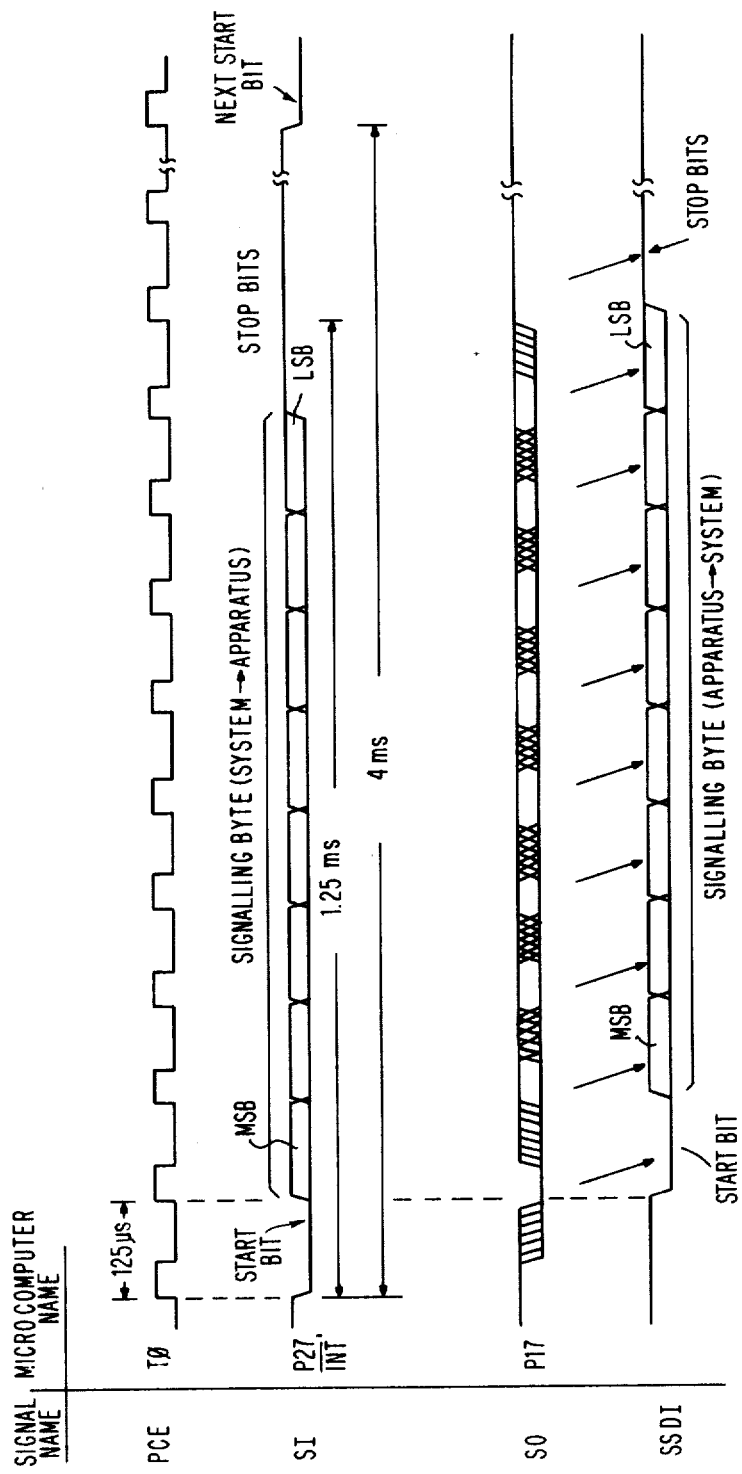
FIG. 11 is a timing diagram of a number of signals appearing in the sync/signalling generator of FIG. 10.

Sync/Signalling Generator (FIGS. 10 and 11)

The internal structure of the sync/signalling generator SSG, as well as its interrelationship with the digital transceiver DTR, serial frame synchronizer SFS and the microcomputer M is shown in FIG. 10. As noted above, the digital transceiver passes digital data in the prescribed frame format to the serial frame synchronizer SFS via the "serial data in" line of the internal data bus. The digital transceiver also receives digital data in this frame format via the "serial data out" line of the internal data bus for transmission on the telephone line TL. Finally, the digital transceiver generates a 192 KHz clock signal from the signals received from the transmission line RL. The 192 KHz clock is passed to both the sync/signalling generator SSG and the serial frame synchronizer SFS, as well as to other components of the digital telephone apparatus (not shown in FIG. 10).

The serial frame synchronizer SFS passes one bit of each 125 microsecond frame to both the P27 input port and the $\overline{INT}$ interrupt input of the microcomputer M. This bit appears in the B1 bit position of the first data word in the frame and may be a start bit, a signalling bit or a stop bit.

As explained previously, the serial frame synchronizer produces three enable signals: sync/signalling enable SSE, primary channel enable PCE and secondary channel enable SCE. These three signals are passed to the sync/signalling generator SSG. The signal PCE is also passed to the T0 or "test input" port of the microcomputer M.

The microcomputer successively generates start, signalling and stop bits and passes these to the sync/signalling generator via its output port P17 and the line S0. These bits are successively latched into a flip-flop FF31 for subsequent insertion in the B1 bit position of a shift register SR via an input line SSDI. The synchronization code 0011011, and its inverse 1100100 are inserted in the SSE shift register SSR from the two outputs of a second flip-flop FF32. This second flip-flop is clocked once per frame by the secondary channel enable signal SCE. This flip-flop is configured to divide the SCE pulses by two so that it toggles upon receipt of each SCE pulse.

The shift register SSR also receives the secondary channel enable signal SCE. When this enable signal is present, the shift register may be loaded, and it will hold its contents without shifting. Upon termination of the SCE signal the shift register will shift its contents out at the 192 KHz clock rate via a tri-state buffer TB. This buffer is enabled by the sync/signalling enable signal SSE to pass the contents of the shift register SR to the "serial data out" line of the internal data bus. The tri-state buffer isolates the shift register from the "serial data out" line during the periods that the second data word and third data word of a frame are transmitted.

FIG. 11 shows the timing of the signals appearing on the lines in FIG. 10 for the period of 1 superframe (4 milliseconds). As is shown, the microcomputer M receives a start bit at its inputs P27 and $\overline{INT}$ coincident with the leading edge of the primary channel enable signal PCE. Similarly, a start bit appears at the output of the flip-flop FF31 on line SSDI upon appearance of the leading edge of the next subsequent pulse of the signal PCE. Thus, all the start, signalling and stop bits are received one 125 microsecond frame earlier by the microcomputer M than the bits passed to the shift register via the first flip-flop FF31, due to the single frame delay introduced by this flip-flop. The use of the flip-flop FF31 to store one bit for one frame period is necessary because the microcomputer is timed by the receipt of a bit and only thereafter does it send a bit out from its output port P17.

The microcomputer M initially establishes synchronism with the superframe by monitoring the bits appearing at its input P27 for 23 stop bits and a subsequent start bit. Once synchronism is established, the microcomputer disables its interrupt $\overline{INT}$ after receiving 8 successive signalling bits until shortly before it expects to receive the next start bit. In this way, the microcomputer will not be interrupted by a stop bit which is erroneously a "0" when it should be "1", so that it will continue to attend to its other functions as the stop bits are received. The microcomputer operates asynchronously from its own high frequency clock. Microcomputer software or firmware is used to determine the expected times of arrival of the pulses on line SI.

Since there is no handshake or echo operation in the communication between the telephone apparatus according to the invention and the telephone system to which it is connected, there is a need for redundancy in the signalling information transmitted to avoid problems upon receipt of an incorrect signalling bit. An incorrect signalling bit can cause the telephone apparatus to function improperly not only during calls but also between calls, since the apparatus is continually "on" as long as it is connected.

Assuming a typical bit error rate of $1 \times 10^{-7}$ (1 incorrect bit out of every 10 million) a bit error would occur every:

$$\frac{10^7 \text{ bits}}{1 \text{ error}} \times \frac{1 \text{ Sec}}{192 \times 10^3 \text{ bits}} \times 52.083 \text{ secs/error}$$

Assuming an equal probability of any of the three words comprising the 24 bit frame of being the word with the bit error, a bit error in the sync/signalling word (first word) would occur every:

$$\frac{52.083 \text{ secs}}{\text{bit error}} \times \frac{3 \text{ bytes}}{\text{frame}} = 156.25 \text{ secs/error}$$

According to the invention, this bit error rate has been increased to an order of magnitude of years per error by sending each signalling word (byte) to the microcomputer 3 successive times. The microcomputer compares the three bytes, bit by bit, and responds to the signalling command only if at least two of the three bytes are equal. Thus, the microcomputer responds to the majority vote of the signalling bytes.

DC/DC Converter (FIG. 12)

As described previously, the DC/DC converter DCC obtains a DC voltage from the primary windings I and II of the transformer TR1. This voltage is phantomed over the transmission lines TL and RL from the originating telephone system. Typically, the received voltage will be approximately 40 volts; however, it is expected to vary over a range of 20-60 volts.

The DC voltage is applied to the DC/DC converter at the input terminals X and Y. The DC to DC converter is isolated from the power supply by a balanced filter comprising the inductance L1 and capacitors C41, C42, C45 and C46. This filter assures a relatively steady voltage at the converter and prevents voltage ripple at the converter from being reflected back to the source. Surges in the input voltage are clipped by a zener diode CR52.

Essentially, the DC/DC converter comprises a monolythic integrated circuit U1 which serves as a source of pulses of constant frequency and variable pulse width. These pulses are applied to the base of a power transistor Q42. The transistor Q42 switches the input voltage applied at the input terminals X and Y across a primary winding I of a transformer TR2, causing interrupted current to flow through this winding.

During the period that a pulse is applied to the base of the transistor Q42, the current will increase in the winding I, increasing the magnetic energy stored in the iron of the transformer. When the pulse disappears and the transistor Q42 is switched off, this stored energy is transformed into eletrical voltages in the secondary windings II, IV, V and VI. These voltages are rectified and filtered by the diodes and capacitors shown, and are applied to the output terminals A, B, D, D and E. The magnitudes of the output voltages depend, of course, upon the respective number of turns in the secondary windings.

The integrated circuit U1 is preferably a TL494 circuit of Texas Instruments, Inc., in Dallas, Tex. A second source for this circuit is Motorola Semiconductor Products, Inc., in Phoenix, Ariz. The TL494 is a fixed-frequency, pulse width modulation control circuit. Modulation of the output pulses is accomplished by comparison of a sawtooth waveform created by an internal oscillator on an external timing capacitor $C_T$, to either of two control signals. The output stage is enabled during that portion of time when the sawtooth voltage is greater than the control signals. As the control signals increase, the period of time the sawtooth input is greater, then decreases. Thus, the output pulse width decreases.

The two control signals in the integrated circuit are derived from several sources; a dead time control and two error amplifiers. The dead time control input is compared directly by a dead time control comparator which has a fixed 100 mV offset. With the dead time control input biased to ground, the output is inhibited during the portion of time that the sawtooth waveform is below 100 mV. This provides a pre-set dead time of approximately 3% which is the minimum dead time that can be programmed. The pulse width modulation comparator in the integrated circuit compares the control signal created by the two error amplifiers. The error amplifiers are used to monitor signals such as the output voltage and current of the DC/DC converter and provide gain such that millivolts of error at their inputs will result in control signals of sufficient amplitude to provide 100% modulation control.

The TL494 also has an internal 5 volt stable reference which is fed to an output pin $V_{ref}$. The pin numbering and the associated pin labels are indicated in FIG. 12. Pins 10 and 11 are the emitter and collector, respectively, of the output transistor used in the DC/DC converter according to the invention.

Whereas the general configuration of the DC/DC converter thus far described is known in the art, the circuit shown in FIG. 12 includes several novel features which support the operation of the converter. These relate to voltage regulation, overload protection, compensation for variations in input voltage, a startup circuit, a soft start circuit and an external clock synchronization circuit.

Voltage regulation is accomplished in the DC/DC converter by providing a reference voltage to one error amplifier input and a load-dependent voltage to the other. In particular, a reference voltage is supplied to the negative input of the error amplifier 1 (pin 2) in U1 and the load-dependent voltage is applied to the positive input of this error amplifier 1 (pin 1). The reference voltage applied to pin 2 is obtained by dividing the $V_{ref}$ generated in U1 with a voltage divider comprising resistors R42 and R43. The resistor values are chosen such that approximately 2 volts are applied to pin 2 from the 5 volt $V_{ref}$. The load-dependent voltage applied to pin 1 is derived from a separate, secondary winding II on the transformer TR2. Any voltage drop at the output, due to increased load, produces a corresponding reduction in the voltage drop across the winding II. The output of this winding is rectified by the diode CR42 and filtered by capacitors C43 and C52. As indicated in FIG. 12, one side of the winding II is grounded.

The filtered voltage is applied to pin 1 of the integrated circuit U1 via a voltage divider comprising resistors R52, R53 and R55. A resistor R53 is arranged in parallel with the resistor R55 and is labeled "$R_x$". This resistor is used to calibrate the DC/DC converter at the factory. Its precise value is determined by monitoring the +5 volt output of the converter under normal load conditions (using a voltmeter, for example) and adjusting the resistance value of $R_x$ until this output is an accurate 5 volts.

With the connections described above, the integrated circuit U1 varies the duty cycle of the pulses applied to the transistor Q42 in such a way that the output voltages of the DC/DC converter remain constant. An increase in load results in a reduction in the voltage applied to pin 1 with respect to that applied to pin 2 of the integrated circuit U1, thus extending the duty cycle of the pulses produced at pin 10 so that more energy is supplied to the transformer TR2 to compensate for the increased load.

If the duty cycle of the pulses applied to the transistor Q42 is increased beyond approximately 65%, however there is a danger that the transistor will "latch up"—that is, remain turned on—because the transistor requires a finite time to turn itself off. This turn-off time, which is called the "storage time" of the transistor, depends upon its base-emitter capacitance. The charge stored within the transistor in this "capacitor" must first dissipate to switch the transistor off.

Dead time control is required in the present circuit to prevent this occurrence. This dead time is affected by utilizing the pin 4 in the integrated circuit U1.

As in the case of the voltage regulation, a reference voltage is applied to the negative input of the error amplifier 2 (pin 15) and a pulse width dependent signal is applied to the positive terminal of the error amplifier 2 (pin 16). The reference voltage is obtained by dividing the voltage $V_{ref}$ with a voltage divider comprising resistors R48 and R56. The pulse width dependent signal is derived by filtering the voltage appearing across the emitter resistor R59. This filter comprises the resistor R58 and the capacitors C47 and C51. If this filtered voltage applied to pin 16 of the integrated circuit U1 exceeds the reference voltage on pin 15, then the PWM comparator within the integrated circuit changes state and the output pulse width goes to zero. During the subsequent cycle, of course, the voltage applied to pin 16 will be less than the reference voltage applied to pin 15 so that the maximum pulse will again be produced. As a result, the DC/DC converter will deliver its maximum rated power output in watts, but no more. Additional load placed across the output terminals will result in lowering the voltage produced at the output.

Variations in the voltage received by the DC/DC converter at power input terminals X and Y are compensated by passing this line voltage to pin 16 via a resistor R45. Consequently, the voltage on pin 16 will increase or decrease as the line voltage increases or decreases, respectively, thus varying the tripping point of the overload protection up or down with line voltage.

A start-up circuit is required in the DC/DC converter because the integrated circuit U1 cannot tolerate a supply voltage $V_{cc}$ of more than 42 volts. As noted above, the input power approximately 40 volts, but it is subject to wide swings in voltage. Consequently, the DC/DC converter is designed to generate its own supply voltage for the integrated circuit U1. However, the integrated circuit requires power during an initial start-up period until the converter generates this voltage.

The start-up circuit comprises a resistor R41, a transistor Q41 and a zener diode CR51. Once the converter is operating, the integrated circuit is supplied voltage from the secondary winding II and the rectifier and filter comprising the diode CR42 and the capacitors C43 and C52.

When the power is initially applied to the input terminals X and Y, current flows through the resistor R31 and the zener CR41. The zener diode maintains the base of the transistor Q41 at its breakdown voltage which is 7.5 volts. The transistor Q41 thus conducts and applies voltage to the inputs $V_{cc}$ (pin 12) and C2 (pin 11) of the integrated circuit U1. This input voltage will be maintained at approximately 6.9 volts.

Thereafter, when the DC/DC converter begins to operate, approximately 8 volts is fed back from the circuit comprising the winding II and its rectifier and filter. This 8 volts reverse biases the transistor Q41, turning it off, and supplies the necessary power to the integrated circuit U1. Since the transistor Q41 is merely operated for a brief period during start-up and need not sustain continued use, it may be a relatively low power, inexpensive device.

When the DC/DC converter is initially started up, it will attempt to power equipment which looks like a short circuit. Until the capacitors in the equipment are charged, the load will be large. While the overload protection in the DC/DC converter will activate under this condition, the DC/DC converter according to the invention is provided with an additional circuit, called a "soft start" circuit, so that the duty cycle of the pulses produced by the integrated circuit U1 will initially be small and will then progressively increase to the full value required by the load.

This soft start circuit comprises resistors R47 and R49 and the capacitor C48. During normal operation, the dead time control (pin 4) of the integrated circuit receives a voltage which is divided from the reference voltage $V_{ref}$ by the voltage divider comprising resistors R47 and R49. This dead time control increases the preset "dead time" (100% minus percent duty cycle) from a minimum of 3% to approximately 65%. However, at the time of start up, the capacitor C48 is discharged, shorting the resistor R47, so that pin 4 will see the full voltage produced at the $V_{ref}$ output on pin 14. Consequently, the dead time will be initially larger (approximately 100%) and then will be reduced to the rated dead time (85%) as the capacitor C48 is charged.

Finally, the DC/DC converter is synchronized with an external 64 KHz clock signal applied to the input Z in order to synchronize the output ripple with the operating frequency of the equipment powered by the converter. There are two problems with this external clock synchronization: (1) the integrated circuit U1 does not have an input for operation by an external clock; and (2) in order to generate an external clock signal it is necessary to provide DC power.

Consequently, the DC/DC converter operates solely with the internal clock of the integrated circuit U1 for an initial start-up period and thereafter operates in a mode which is synchronized with the external clock.

The clock synchronization circuit comprises a transformer TR3 having windings III and VII, transistors Q43 and Q44 as well as resistors R51 and R60, capacitor C53 and diode CR64. The clock signal, when it is eventually generated after the equipment driven by the DC/DC converter is powered up, is applied to the base of the transistor Q44. This transistor conducts only when power is applied from the positive 5 volt terminal D and the ground terminal E. Consequently, after start-up, positive and negative pulses are alternately applied to the base of the transistor Q43, thus alternately switching this transistor on and off in synchronism with the external clock. When the transistor Q43 is switched off, the resistor R51 is connected in parallel with the resistor R50.

The frequency and period of the internal clock of the integrated circuit U1 is controlled by the capacitance and resistance connected between ground and the terminal $C_T$ (pin 5) and $R_T$ (pin 6). The pulse period is therefore $R_T C_T$ so that the period may be varied by changing either $R_T$ or $C_T$.

According to the present invention, the time constant $R_T C_T$ is selected (by selecting the values of R50 and C49) so that the natural period of the internal oscillator of the integrated circuit UL is longer than the period of the external clock. Upon receipt of each external clock pulse, the value of $R_T$ is lowered (by connecting the resistor R51 in parallel) so as to shorten the time constant $R_T C_T$. Consequently, on every cycle the internal oscillator sees an initial, relatively large $R_T C_T$ and subsequently, a relatively short $R_T C_T$ with the result that its period corresponds to that of the external clock.

General

As described above the digital telephone apparatus according to the invention is connected for duplex communication with the telephone speech transmission line TL/RL. This apparatus includes the digital transmitter/receiver or transceiver DTR, which is connected with the transmission line TL/RL for transmitting and receiving digital speech data, signalling data and other information via the transmission line TL/RL and also via the internal data bus IB. The serial frame synchronizer SFS detects the synchronization bits and controls the exact timing of the time slots of the data channels in each frame format as well for incoming as for outgoing speech and data transmission.

This configuration of the digital telephone apparatus permits the simple adaption and connection to the normal four wires used in telephone lines. Thus, in a very simple and effective manner it becomes possible to receive and transmit synchronized PCM data, which includes speech data as well as other data and signals.

Because either the primary codec/PCM filter PCF or at least one secondary codec/PCM filter SCF is connected with the internal data bus IB and, via switching means of the voice grade analog circuit VAC, with the microphones, the receiver and the loudspeaker of the subscriber/attendant set, thus utilizing only one channel for PCM voice transmission, at least one more channel is available for the simultaneous transmission of a further data word in the PCM frame format. It is therefore possible to receive and to transmit, completely independently of each other, two different kinds of data. Consequently, the internal data bus IB may be connected with additional peripheral equipment for additional features.

If the internal data bus IB is connected with a peripheral data system, the subscriber who is using the telephone apparatus according to the invention may simultaneously transmit and receive the speech data as well as all types of other data, for example from an external computer.

The transceiver DTR generates pulses in a needed timing scheme with the required broadness, and the serial frame synchronizer places the data bytes in the correct time slots of the frame format. This format contains at least a first plurality of synchronization bits with at least one added signal information bit as a first word and at least a second plurality of speech information bits and/or data information bits as a second word. Each word has one byte of information. In this way the transmission of synchronizing bits, signalling bits, speech and other data bits is PCM compatible and is organized in a simple easily-processed manner.

In small systems, without connected peripheral equipment, a frame may be formed in a very simple, inexpensive manner by two bytes. In larger systems the second byte in a frame represents a speech word whereas the third byte may represent another speech word or a data word. In this way, the telephone apparatus may serve as a telecommunications device for certain peripheral equipment such as a data system connected to the apparatus via a digital interface DDI. Accordingly, the frame format makes it possible to transmit simultaneously different data on separate channels of the same frame.

Line and function keys KL, dial keys KD, an alphanumeric display AD and a subscriber message detailed recording printer SMDR are all connectable, directly or indirectly via logic means KLO, with the microcomputer M of the telephone apparatus according to the invention to provide convenient human-interactive input and output. These I/O devices are operated at a much slower speed than the data system mentioned just above.

Furthermore, in the digital telephone apparatus the voice grade analog circuit switching means VAC controlled by the microcomputer M enables an optional transmission of speech data via one of the two codec/PCM filters in one of the corresponding frame words or channels. This arrangement makes it possible not only to transmit data from a data system simultaneously with PCM voice, but also, for example, to establish a call back connection with a remote subscriber or establish an "intercom" connection with a second subscriber independently of the original call. To this end, optional calling and called subscriber signals evaluated by the microcomputer M produce switching commands which control the voice grade analog circuit switching means VAC to interconnect different optional peripheral units with the telephone apparatus. Therefore, the optional use of one and/or both codec/PCM filters, PCF or SCF, makes it possible to use more than one transmission channel in a simple way both separately as well as simultaneously.

The number of frame words fixes the possible number peripheral units which may be simultaneously connected with the digital telephone transmission line. In other words, the number of 8-bit words in a frame determines the number of features which may be added to the telephone apparatus. If three or more words are provided, for example, thereby providing two or more transmission channels, it is possible to simultaneously and independently connect two or more voice grade analog circuits VAC, at least one data system DDI as well as video terminals and/or printers, etc. with the four wire transmission line TL/RL.

There has thus been shown and described a novel digital telephone apparatus which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A synchronizing circuit for use with a digital communication system, said system including a transmission line arranged between a transmitting and a receiving terminal for transmitting a serial data stream at a fixed data rate under control of a system clock pulse train received by a system clock pulse line and arranged in frames each composed of a first data word containing a binary synchronization code for recovering a frame in the continuous serial data stream and a signalling code for enabling control operations of said communication system and at least a second data word containing binary coded information, said synchronizing circuit adapted to be connected to said receiving end of said transmission line for recovering the alignment of consecutive frames in the serial data stream and comprising, in combination:
(a) a serial/parallel converter being designed for a capacity of one data word of said frame and having a serial data input coupled to said transmission line, a clock input connected to said system clock pulse line, and a plurality of parallel data outputs;
(b) a synchronizing detector logic network having parallel inputs each connected to a respective one of said parallel data outputs of said serial/parallel converter and having a first and a second output, said synchronizing detector logic network generating a first and a second control signal at the respective one of said first and second outputs, wherein a respective one of said control signals occurs whenever a condition at said parallel data outputs of said serial/parallel converter reflects a synchronization code in form of a normal synchronizing bit pattern and an inverted synchronizing bit pattern, respectively;
(c) means for delaying said first control signal for a time period equivalent to the time required for receiving one frame and having an input and an output, said input of said delay means being connected to said first output of said synchronizing detector logic network;
(d) an AND-gate having a first and a second input and an output generating in synchronized operation a synchronizing signal once every alternate frame, said first input of said AND-gate being connected to said output of said delay means and said second input of said AND-gate being connected to said second output of said synchronizing detector logic network; and
(e) a time slot generator having a clock input for receiving said system clock pulse trains, a synchronizing signal input connected to the output of said AND-gate and a first and a second generator output each carrying a respective one of a first and a second enabling signal, said time slot generator including means for counting subsequent clock pulses under control of said synchronizing signal such that during receiving the first data word said first generator output and during the receiving the second data word said second generator output subsequently are carrying a respective one of said enabling signals.

2. The synchronizing circuit as recited in claim 1, wherein said serial-to-parallel converter comprises an 8-bit shift register having eight parallel outputs and wherein the seven most significant parallel outputs form said data outputs for detecting said synchronizing bit patterns.

3. The synchronizing circuit as recited in claim 2, wherein said synchronizing detector logic unit comprises:
(f) a plurality of inverters each having an input and an output and each being connected by its input to a respective one of said most significant data outputs of said shift register, the synchronizing detector logic unit thus being provided with a set of normal inputs and a set of inverted inputs;
(g) a second and a third AND-gate each having a plurality of inverting inputs and an output forming a respective one of said outputs of said synchronizing detector logic unit and each of said inverted inputs of both AND-gates either being connected to a respective one of said set of normal inputs or the corresponding inverted input such that both AND-gates form all zero detectors and, alternatively, generate a control signal reflecting the occurrance of a normal and an inverted synchronizing bit pattern at said most significant data outputs of said shift register.

4. The synchronizing circuit as recited in claim 3, wherein said third AND-gate is provided with a further inverted input connected to said system clock pulse line whereby said third AND-gate is controlled to be in its operative mode just during the negative phase of a clock pulse.

5. The synchronizing circuit as recited in claim 1, wherein said delay means comprise a binary counter arrangement having a maximum count and including a count pulse input connected to said system clock pulse line, a load input coupled to said output of said second AND-gate for presetting said counter arrangement to an initial count having an offset from said maximum count equivalent to the number of bits of a frame, and an output forming the output of said delay means.

6. The synchronizing circuit as recited in claim 5, wherein said counter arrangement further comprises a first and a second binary counter both having load inputs, count inputs, count enable inputs and carry outputs, said count inputs of the first and the second counter being connected to said system clock pulse line such that a counting step of said first counter is activated by the negative to positive transition of said system clock pulses and a counting step of said second counter is activated by the positive to negative transition of said system clock pulses, said count enable input of said first counter being connected to positive supply voltage and said count enable input of said second counter being connected to said carry output of said first counter; and said carry output of said second counter forming the output of said counter arrangement.

7. The synchronizing circuit as recited in claim 5, wherein said delay means further comprise an OR-gate having a first and a second input and an output, said first input of said OR-gate being connected to the output of the second AND-gate, said second input of said OR-gate being connected to said output of said counter arrangement and said output of said OR-gate being connected to the load input of said counter arrangement.

8. The synchronizing circuit as recited in claim 1, wherein said time slot generator in accordance with pulse frames composed of three data words, further comprises:

(h) a third binary counter having a clock input coupled to said system clock pulse line such that said counter is activated by the negative to positive transitions of said clock pulse train, said counter furthermore having a reset input connected to said output of said first AND-gate and being designed such that the maximum count equals the number of bits of a data word of a pulse frame;

(i) a first and a second D flip-flop each having a clock input, a set input, a data input, a normal output activated in the set condition and a reset input; both clock inputs of said D flip-flops being commonly coupled to said maximum count output of said third binary counter, said data input of said first D flip-flop being fixedly connected to positive supply voltage, said data input of said second D flip-flop being connected to said normal output of said first D flip-flop, said set input of said first D flip-flop and the reset input of said second D flip-flop being commonly connected to said output of said first AND-gate, said set input of said second D flip-flop being fixedly connected to ground, said reset input of said first D flip-flop being connected to said normal data output of said second D flip-flop; and said normal outputs of said first and said second D flip-flop each forming a respective one of said first and second generator outputs; and (j) a fourth AND-gate having two inverted inputs and an output, each of said inverted inputs being connected to a respective one of said normal outputs of said first and second D flip-flops and the output of said fourth AND-gate forming a third time slot generator output carrying an enabling signal occurring in synchronization with the presence of the first data word of a frame.

9. The synchronizing circuit as recited in claim 1, comprising a further D flip-flop having a data input connected to the least significant output of said shift register, having a clock input connected to said output of said first AND-gate and having a normal output forming an output for a signalling bit, representing said signalling code.

* * * * *